United States Patent
Velozo et al.

(10) Patent No.: US 8,595,254 B2
(45) Date of Patent: Nov. 26, 2013

(54) ROSTER BUILDING INTERFACE

(75) Inventors: Steven C. Velozo, Seattle, WA (US); Alexander H. Decker, Seattle, WA (US); Ryan J. Vanderpol, Kirkland, WA (US)

(73) Assignee: Promethean, Inc., Alpharetta, GA (US)

( * ) Notice: Subject to any disclaimer, the term of this patent is extended or adjusted under 35 U.S.C. 154(b) by 618 days.

(21) Appl. No.: 12/732,636

(22) Filed: Mar. 26, 2010

(65) Prior Publication Data

US 2010/0257483 A1 Oct. 7, 2010

Related U.S. Application Data

(63) Continuation-in-part of application No. 12/546,496, filed on Aug. 24, 2009.

(60) Provisional application No. 61/166,624, filed on Apr. 3, 2009.

(51) Int. Cl.
G06F 7/00 (2006.01)
G06F 17/30 (2006.01)

(52) U.S. Cl.
USPC .................. 707/767; 707/805; 715/700

(58) Field of Classification Search
None
See application file for complete search history.

(56) References Cited

U.S. PATENT DOCUMENTS

| | | | |
|---|---|---|---|
| 5,601,432 A * | 2/1997 | Bergman | 434/118 |
| 5,864,869 A * | 1/1999 | Doak et al. | 1/1 |
| 6,028,602 A | 2/2000 | Weidenfeller | |
| 6,122,624 A * | 9/2000 | Tetro et al. | 705/44 |
| 6,755,661 B2 | 6/2004 | Sugimoto | |
| 6,988,138 B1 | 1/2006 | Alcorn et al. | |
| 7,137,821 B2 * | 11/2006 | Jorgensen et al. | 434/323 |
| 7,210,938 B2 | 5/2007 | Packard et | |
| 7,493,396 B2 | 2/2009 | Alcorn et al. | |
| 7,558,853 B2 | 7/2009 | Alcorn et al. | |
| 7,568,160 B2 * | 7/2009 | Berger et al. | 715/750 |
| 7,657,220 B2 | 2/2010 | Townshend | |
| 7,716,167 B2 | 5/2010 | Colossi et al. | |
| 2002/0161778 A1 | 10/2002 | Linstedt | |
| 2004/0162753 A1 * | 8/2004 | Vogel et al. | 705/10 |
| 2006/0121433 A1 * | 6/2006 | Adams | 434/323 |
| 2006/0168134 A1 * | 7/2006 | Berger et al. | 709/219 |
| 2007/0184424 A1 | 8/2007 | Packard et al. | |
| 2007/0184425 A1 | 8/2007 | Packard et al. | |

(Continued)

OTHER PUBLICATIONS

Official Action for U.S. Appl. No. 12/546,496, mailed Aug. 8, 2011 9 pages.

(Continued)

*Primary Examiner* — Wilson Lee
*Assistant Examiner* — Jessica N Le
(74) *Attorney, Agent, or Firm* — Sheridan Ross P.C.

(57) ABSTRACT

Described is a system, method, and product for building a roster. A user interface is rendered. A list of entities is presented. A selection of a first entity and a second entity are received via the user interface. A first list of elements associated with the first entity and a second list of elements associated with the second entity are presented. A selection of an element from the first list of elements is received via the user interface. The second list is updated to include only elements associated with the selected element. A roster is generated, wherein the roster includes summary data, the summary data corresponding to the elements in the updated second list. The summary data is displayed in the user interface.

13 Claims, 25 Drawing Sheets

(56) References Cited

U.S. PATENT DOCUMENTS

| | | |
|---|---|---|
| 2007/0184426 A1 | 8/2007 | Packard et al. |
| 2008/0057480 A1 | 3/2008 | Packard et al. |
| 2008/0059484 A1 | 3/2008 | Packard et al. |
| 2008/0243933 A1* | 10/2008 | Holtzman et al. .......... 707/104.1 |
| 2009/0035733 A1 | 2/2009 | Meitar |
| 2009/0047648 A1 | 2/2009 | Ferreira |
| 2009/0164476 A1* | 6/2009 | Acree .............................. 707/10 |
| 2009/0175436 A1* | 7/2009 | Sarin et al. ................. 379/265.01 |
| 2009/0186327 A1 | 7/2009 | McGinley et al. |
| 2009/0187815 A1 | 7/2009 | Becerra, Sr. |
| 2009/0259514 A1* | 10/2009 | Kumar et al. ....................... 705/9 |
| 2009/0317786 A1* | 12/2009 | Alcorn et al. .................. 434/323 |
| 2010/0255455 A1 | 10/2010 | Velozo et al. |
| 2010/0257136 A1 | 10/2010 | Velozo et al. |

OTHER PUBLICATIONS

Official Action for U.S. Appl. No. 12/546,496, mailed Apr. 9, 2012 18 pages.

Official Action for U.S. Appl. No. 12/732,026, mailed Mar. 6, 2012 4 pages Restriction Requirement.

* cited by examiner

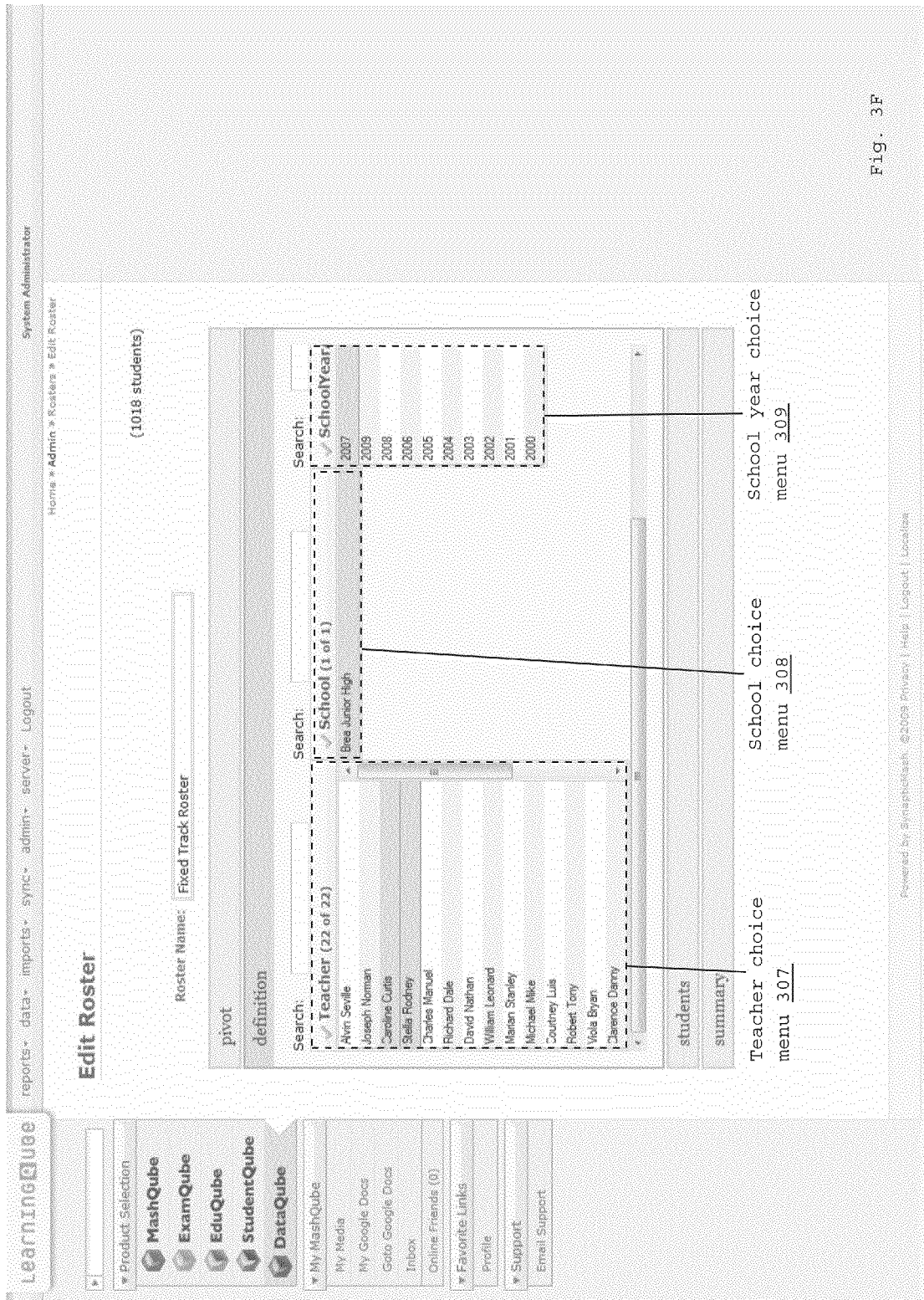

Fig. 3G

Edit Roster

Roster Name: Fixed Track Roster (1018 students)

pivot
definition
students

| StudentRace |
| --- |
| None Specified |
| NH-White |
| NH-Black |
| NH-Asian |
| NH-Amer Indian |
| NH-Native Hawaiian |
| NH-White/Black |
| NH-White/Asian |
| NH-White/Amer Indian |
| NH-White/Native Hawaiian |
| NH-Black/Asian |
| NH-Black/Amer Indian |
| NH-Black/Native Hawaiian |
| StudentSex |
| StudentLunchStatus |
| StudentDisability | summary

Student metadata choice menu 311
Student race choice pane 312
Student frame 310

Edit Roster

Home » Admin » Rosters » Edit Roster

Roster Name: Fixed Track Roster                    (86 students)

pivot definition summary

Filters
Student (0 selections)
StudentRace (1 selections)
  Nh-Asian (1842 Students)
StudentSex (1 selections)
  M (5088 Students)
StudentLunchStatus (0 selections)
StudentDisability (0 selections)
Teacher (2 selections)
  Caroline Curtis (4003 Students)
  Stella Rodney (3897 Students)
School (1 selections)
  Brea Junior High (5443 Students)
SchoolYearArchetype (1 selections)
  2007 (6210 Students)

Roster display 315

Summary frame 314

Edit Roster

Roster Name: Custom Track Roster pivot definition students (3 students)

summary

Filters
Student (0 selections)
StudentRace (0 selections)
StudentSex (0 selections)
StudentLunchStatus (1 selections)
  Reduced Lunch Eligible (565 Students)
StudentDisability (0 selections)
Teacher (1 selections)
  Vivian Damon (253 Students)
School (1 selections)
  Mariposa Elementary (1134 Students)
Grade (2 selections)
  Fifth Grade (4971 Students)
  Sixth Grade (5050 Students)
Class (1 selections)
  Physical Education (789 Students)
SchoolYearArchetype (1 selections)
  2009 (6008 Students)

Summary frame 314

Roster display 315

ROSTER BUILDING INTERFACE

CROSS-REFERENCE TO RELATED APPLICATIONS

This application claims the benefit of Provisional Patent Application Ser. No. 61/166,624, filed Apr. 3, 2009, for all purposes including but not limited to the right of priority and benefit of earlier filing date, and expressly incorporates by reference the entire content of Provisional Patent Application Ser. No. 61/166,624.

This application is a Continuation-In-Part of patent application Ser. No. 12/546,496, filed Aug. 24, 2009, for all purposes including but not limited to the right of priority and benefit of earlier filing date, and expressly incorporates by reference the entire content of patent application Ser. No. 12/546,496 for all purposes.

BACKGROUND

Traditionally, school systems and other educational entities have accessed and manipulated data that is stored and retrieved from a data store in connection with a hierarchical data model. Typically, the hierarchical data model is a rigid tree structure, in which the choice of a parent data set (for example, data corresponding to a school) is followed by the selection of a child data set (for example, data corresponding to a class) which stems from the previously-selected parent data set. Thus, a teacher or other school official who is preparing a report in accordance with the traditional data model, has severely limited options. For example, the teacher cannot select a particular class (e.g., $10^{th}$ grade English), followed by a particular school, in the event the desired class is a child data set of a parent data set, which parent data set corresponds to the desired school.

Unfortunately, a method of building a report through the choice of items from element sets that correspond to a relational data model, which offers the ability to generate comparisons between elements in any selected data sets, and which allows data sets to be selected in any desired order, has eluded those skilled in the art until now.

SUMMARY

The present invention provides a method for building a roster via a user interface, and a system and product for its implementation.

BRIEF DESCRIPTION OF THE DRAWINGS

FIGS. 3A through 3J illustrate representative embodiments of the present method, system, and product for building a roster via a user interface.

FIGS. 4A through 4L illustrate other representative embodiments of the present method, system, and product for building a roster via a user interface.

DETAILED DESCRIPTION

Figure 1:
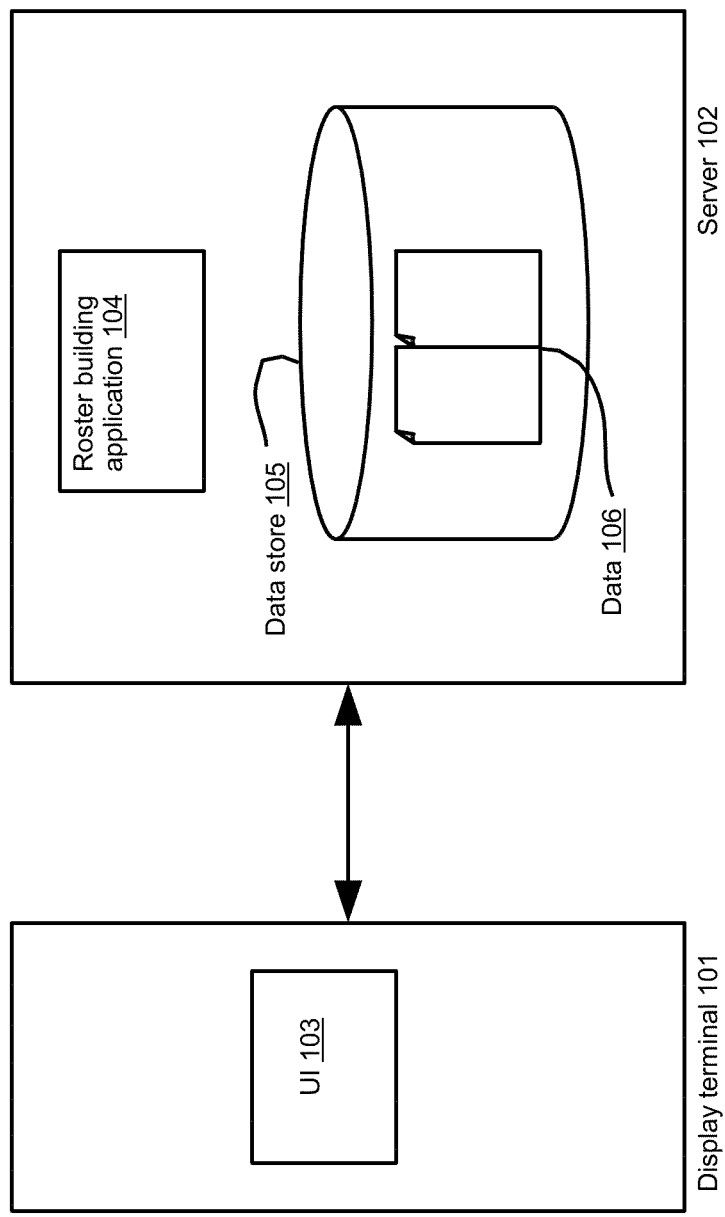
FIG. 1 illustrates by way of a block diagram one embodiment of the present method, system, and product for building a roster via a user interface.

In the following discussion, many specific details are provided to set forth a thorough understanding of the present invention. It will be obvious, however, to those skilled in the art that the present invention may be practiced without the explicit disclosure of some specific details, and in some instances of this discussion with reference to the drawings, known elements have not been illustrated in order to not obscure the present invention in unnecessary detail. Such details concerning computer networking, software programming, telecommunications and the like may at times not be specifically illustrated as such are not considered necessary to obtain a complete understanding of the core present invention, but are considered present nevertheless as such are considered to be within the skills of persons of ordinary skill in the art.

It is also noted that, unless indicated otherwise, all functions described herein may be performed in either hardware, software, firmware, or some combination thereof. In some embodiments the functions may be performed by a processor, such as a computer or an electronic data processor, in accordance with code, such as computer program code, software, and/or integrated circuits that are coded to perform such functions. Those skilled in the art will recognize that software, including computer-executable instructions, for implementing the functionalities of the present invention may be stored on a variety of computer-readable media including hard drives, compact disks, digital video disks, integrated memory storage devices and the like. Without limitation, the data described herein may be stored in (and accessed via) the data warehouse described in U.S. patent application Ser. No. 12/546,496.

Furthermore, the following discussion is for illustrative purposes only, and discusses the present invention in reference to various embodiments which may perhaps be best utilized subject to the desires and subjective preferences of various users. One of ordinary skill in the art will, however, appreciate that the present invention may be utilized in a great variety of forms in learning environments of any type. Unless explicitly stated, the method embodiments described herein are not constrained to a particular order or sequence. Additionally, some of the described method embodiments or elements thereof can occur or be performed at the same point in time.

The various embodiments described herein are directed to a method, system, and product for building a roster via a user interface. Briefly stated, the present embodiment allows the building of a report containing information related to one or more entities in a relational data model, including without limitation an entity-relationship model. As used herein, an "entity" is a collection of data (including but not limited to a data set or a data structure) which may be uniquely identified and which is related to a particular subject. For example and without limitation, "school" may be an entity, in which event the entity "school" may refer to a collection of data which may be uniquely identified and which is related to one or more schools. As another example and without limitation, "teacher" may be an entity, in which event the entity "teacher" may refer to a collection of data which may be uniquely identified and which is related to one or more teachers.

As used herein, "element" means a subset of an entity, which subset is a collection of data (including but not limited to a data set or a data structure) which may be uniquely identified and which is related to a particular subject. For example, "East High School" may be an element within the entity "school", in which event the element "East High School" may refer to a collection of data which may be uniquely identified and which is related to East High School.

As used herein, "element set" means a list of elements related to a particular entity. For example, a list of schools (e.g. "East High School", "West High School", and "South High School") may be an element set. Without limitation, other element sets may include a list of students, a list of classes, etc. "Summary data" means the data generated by a process of selecting one or more element sets (which may be accomplished, without limitation, by selecting one or more entities with which the one or more element sets are associated) and further selecting one or more elements from the one or more element sets. The process for generating summary data may further include the selection of one or more filter options, wherein the selection of one or more filter options narrows the data produced by the selection of i) one or more element sets and ii) one or more elements from the one or more element sets. For example, one filter option may be "male", in which event the data produced by the selection of i) one or more element sets and ii) one or more elements from the one or more element sets, would be narrowed to include only males. "Roster" refers to a data file which contains summary data.

The present embodiment allows the building of a roster through the selection of one or more element sets, the selection of one or more elements from the one or more element sets and (optionally) the selection of one or more filter options. The present embodiment offers many advantages, including but not limited to the ability to generate comparisons between elements from any selected entities, and which allows entities and/or elements to be selected in any desired order.

Referring now to FIG. 1, there is shown in the form of a block diagram one embodiment of an aspect of the present embodiment for building a roster via a user interface. In the embodiment shown, server 102 is in communication with one or more display terminals 101. Server 102 may be directly connected to display terminals 101. Alternatively, server 102 may be in communication with display terminals 101 via the Internet or any other means of remote communication. Any combination of data storage devices, including without limitation computer servers, using any combination of programming languages and operating systems that support network connections, is contemplated for use in the present inventive method, system, and product. By way of example and without limitation, the Microsoft .NET framework may be used. The inventive method, system, and product are also contemplated for use with any communication network, and with any method or technology which may be used to communicate with said network, including without limitation wireless fidelity networks, Ethernet, Universal Serial Bus (USB) cables, TCP/IP wide-area networks, the Internet, and the like.

In the embodiment shown, user interface (UI) 103 is depicted. UI 103 may take the form of a web browser, or any other means by which audio, video, text and/or other content may be displayed, and by which data may be received and transmitted—for example and without limitation, Asynchronous Javascript and XML (AJAX). Styling may be accomplished via CSS style sheets or any other technique. UI 103 may be used in connection with one or more display terminals.

In the embodiment shown, roster building application ("RBA") 104 is resident on server 102. Alternatively, RBA 104 may be stored in persistent or volatile memory, and may be distributed on one or more servers and/or one or more clients (for example and without limitation, RBA 104 may be stored on a computer or other device associated with display terminal 101). RBA 104 may take the form of one or more components.

Data store 105 includes data 106. In the present embodiment, data 106 may be in the form of a multidimensional data structure from which one or more multidimensional data sets may be created. Without limitation, data store 105 may be the data warehouse described in U.S. patent application Ser. No. 12/546,496. Without limitation, data 106 may be the verified data described in U.S. patent application Ser. No. 12/546,496.

In the embodiment shown, RBA 104 oversees the processes relating to the present method, system, and product for building a roster via a user interface. RBA 104 may render UI 103 at display terminal 101. The word "render" is used herein according to its broadest meaning, and may include any operation which causes a graphical representation to be presented. RBA 104 may retrieve and transmit data (including but not limited to web pages) from data store 105, or any other data store, in accordance with the operations indicated at UI 103.

Figure 2:
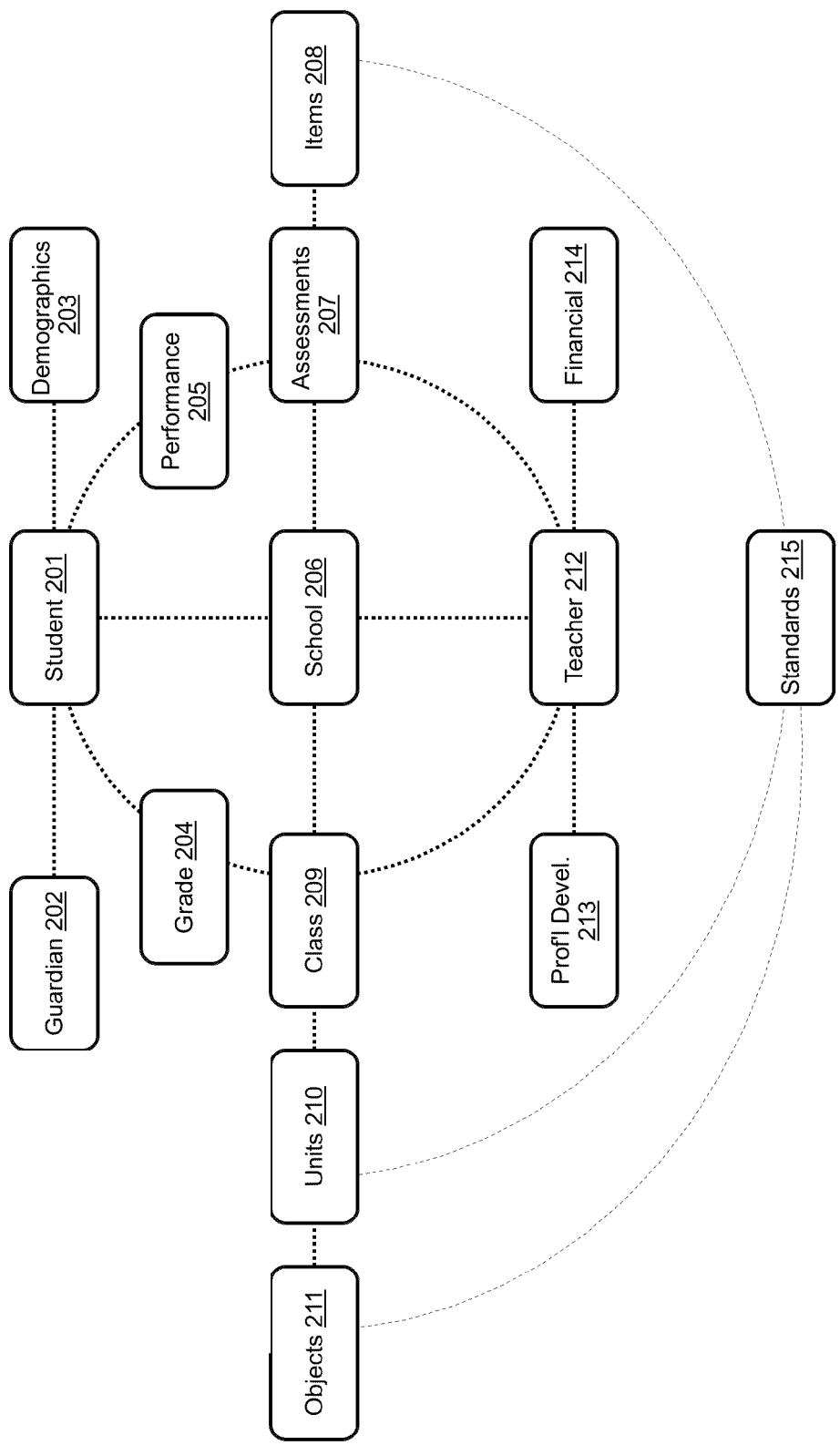
FIG. 2 illustrates by way of a block diagram one implementation of a data model used in connection with the data 106 introduced in conjunction with FIG. 1.

As shown in FIG. 2, there is depicted a block diagram illustrating one implementation of a complex relational data model used in connection with the data 106 introduced in conjunction with FIG. 1. FIG. 2 illustrates a unique entity-relationship model of educational data (described by a cyclical graph), with the ability to perform comparison reports between any number of entities and/or elements. Any particular datum within data 106 may be mapped to one or more entities depicted on FIG. 2. It is to be understood that the entities illustrated in FIG. 2 are only representative, and that other entities may be used in connection with the data model illustrated in FIG. 2. RBA 104, in response to selections made via UI 103, may plot connections between one or more entities and/or elements corresponding to the data model illustrated in FIG. 2. RBA 104 may use a graph advanced data type ("ADT") to plot connections between one or more entities and/or elements corresponding to the data model illustrated in FIG. 2. The graph ADT may produce SQL queries and table layouts to provide tabular data which may be displayed via UI 103.

In the embodiment shown, FIG. 2 is a flat representation of a multidimensional data model which includes the following entities: guardian 202, student 201, demographics 203, grade 204, performance 205, objects 211, units 210, class 209, school 206, assessments 207, items 208, professional development 213, teacher 212, financial 214, and standards 215. Student 201 may refer to a collection of data which may be uniquely identified and which is related to one or more students. Guardian 202 may refer to a collection of data which may be uniquely identified and which is related to one or more guardians of one or more students. Guardian 202 may include, without limitation, for any particular guardian, activities that affect the educational needs of that particular guardian's child or children. Demographics 203 may refer to a collection of data which may be uniquely identified and which is related to student demographics as defined by federal, state and/or district reporting guidelines.

Grade 204 may refer to a collection of data which may be uniquely identified and which is related to one or more grades in one or more schools (for example and without limitation, kindergarten and/or $7^{th}$ grade). Performance 205 may refer to a collection of data which may be uniquely identified and which is related to the performance of one or more students (for example and without limitation, performance 205 may include the performance grades such as A, B, C., etc. and/or test scores related to one or more students). School 206 may refer to a collection of data which may be uniquely identified and which is related to one or more schools.

Assessments 207 may refer to a collection of data which may be uniquely identified and which is related to one or more assessments. "Assessment" as used herein refers to a series of questions presented for student response. Assessments are more fully described in U.S. patent application Ser. No. 12/732,026, filed Mar. 25, 2010, titled "Adaptive Assessment". This application expressly incorporates by reference the entire content of U.S. patent application Ser. No. 12/732,026, filed Mar. 25, 2010, for all purposes.

Items 208 may refer to a collection of data which may be uniquely identified and which is related to one or more items. "Item" as used herein refers to an item comprising a query for student response (for example and without limitation: "A large square is divided into same-size smaller squares as shown below. What is the area of the shaded region?"). Class 209 may refer to a collection of data which may be uniquely identified and which is related to one or more classes (e.g., "English", "history", etc.).

Objects 211 may refer to a collection of data which may be uniquely identified and which is related to one or more objects. Units 210 may refer to a collection of data which may be uniquely identified and which is related to one or more units. "Object" as used herein refers to a specific piece of curriculum, and "unit" as used herein refers to a subset of an object.

Teacher 212 may refer to a collection of data which may be uniquely identified and which is related to one or more teachers. Teacher 212 may include, without limitation, classroom data tailored to the personal educational processes of one or more teachers. Without limitation, teacher 212 may include alerts and requests from one or more educational bodies such as departments, schools, and districts.

Professional development 213 may refer to a collection of data which may be uniquely identified and which is related to the professional development of one or more teachers, administrators, or other persons working within an educational system. Without limitation, professional development 213 may include subjective review and community systems for optimal retention and growth of institutional knowledge.

Financial 214 may refer to a collection of data which may be uniquely identified and which is related to the financial status (for example and without limitation, cost-effectiveness) of one or more other entities and/or elements. Standards 215 may refer to a collection of data which may be uniquely identified and which is related to one or more standards. In this application, "standard" refers to any type of standard which permits the assessment of a student's knowledge. By way of example and without limitation, the following standards are taken from the current version of the Indiana Department of Education's Academic Standards for mathematics, grade 4, standard 1:

4.1.1—Read and write whole numbers up to 1,000,000.
4.1.2—Identify and write whole numbers up to 1,000,000, given a place-value model.
4.1.3—Round whole numbers up to 10,000 to the nearest ten, hundred, and thousand.
4.1.4—Order and compare whole numbers using symbols for "less than" (<), "equal to" (=), and "greater than" (>).
4.1.5—Rename and rewrite whole numbers as fractions.

One or more items associated with items 208 may be aligned with one or more standards associated with standards 215—that is, an item (or items) may be designed to test a student's knowledge of the material associated with the standards with which the item (or items) is aligned.

The data model illustrated in FIG. 2 may reflect longitudinal data across any axis. For instance, with respect to schools, the model as illustrated demonstrates a many-to-one relationship deriving from the school 206 entity in the center, which may then be pivoted across a new dimension for the school year. Similarly, the model can be adopted to look at information contextualized for a student, teacher, curriculum, assessments, etc. Tagged with financial information, this model can analyze cost-effectiveness from any level as well. Use of this model in connection with the present embodiment permits easy comparisons of schools with one another, or comparisons of district school systems, state school systems, and the like.

Figure 3A:
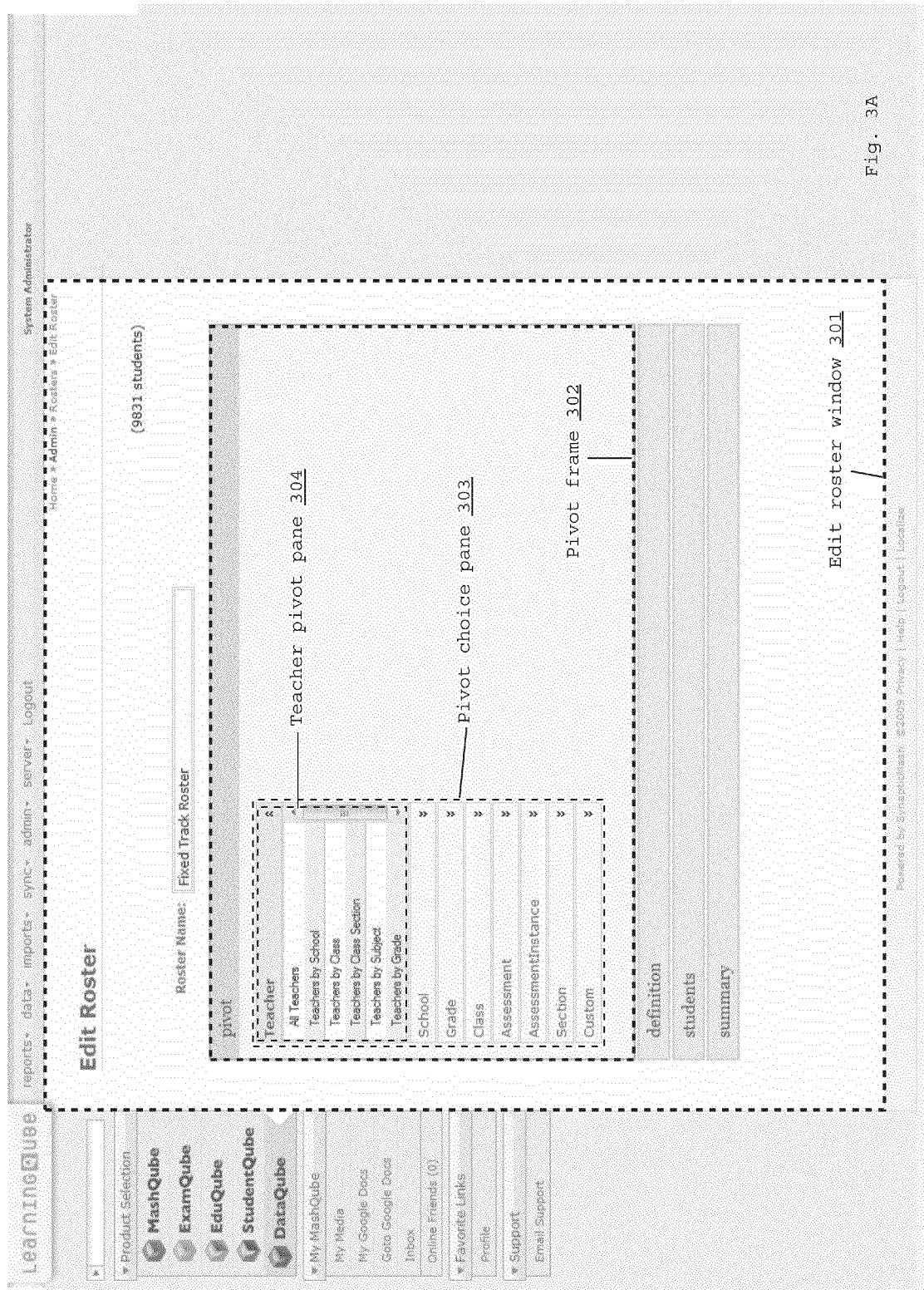

FIGS. 3A through 3J illustrate representative embodiments of the present method, system, and product for building a roster via a user interface. In FIG. 3A, there is illustrated one embodiment of UI 103 as rendered by RBA 104. In the embodiment shown, there is provided an edit roster window 301. Edit roster window 301 includes pivot frame 302. Pivot frame 302 includes pivot choice pane 303. The various options provided in connection with pivot choice pane 303 allow a user, via UI 103, to pivot and/or join one or more element sets (or any other types of data sets) associated with one or more entities (as described in FIG. 2).

In the present embodiment, when a user clicks on the "teacher" link provided in pivot choice pane 303, teacher pivot pane 304 may open and provide a number of selections—for example and without limitation, "teachers by school", "teachers by class", etc. As illustrated in FIG. 3A, the selections provided in teacher pivot pane 304 include one or more fixed pivot sets. "Pivot set" refers to a pre-established group of one or more entities which a user may select to indicate a desire to build a roster from data associated with the selected group of entities. For example and without limitation, a user's selection of "teachers by school" may indicate a desire to build a roster from data associated with teacher 112 and school 106.

Figure 3B:
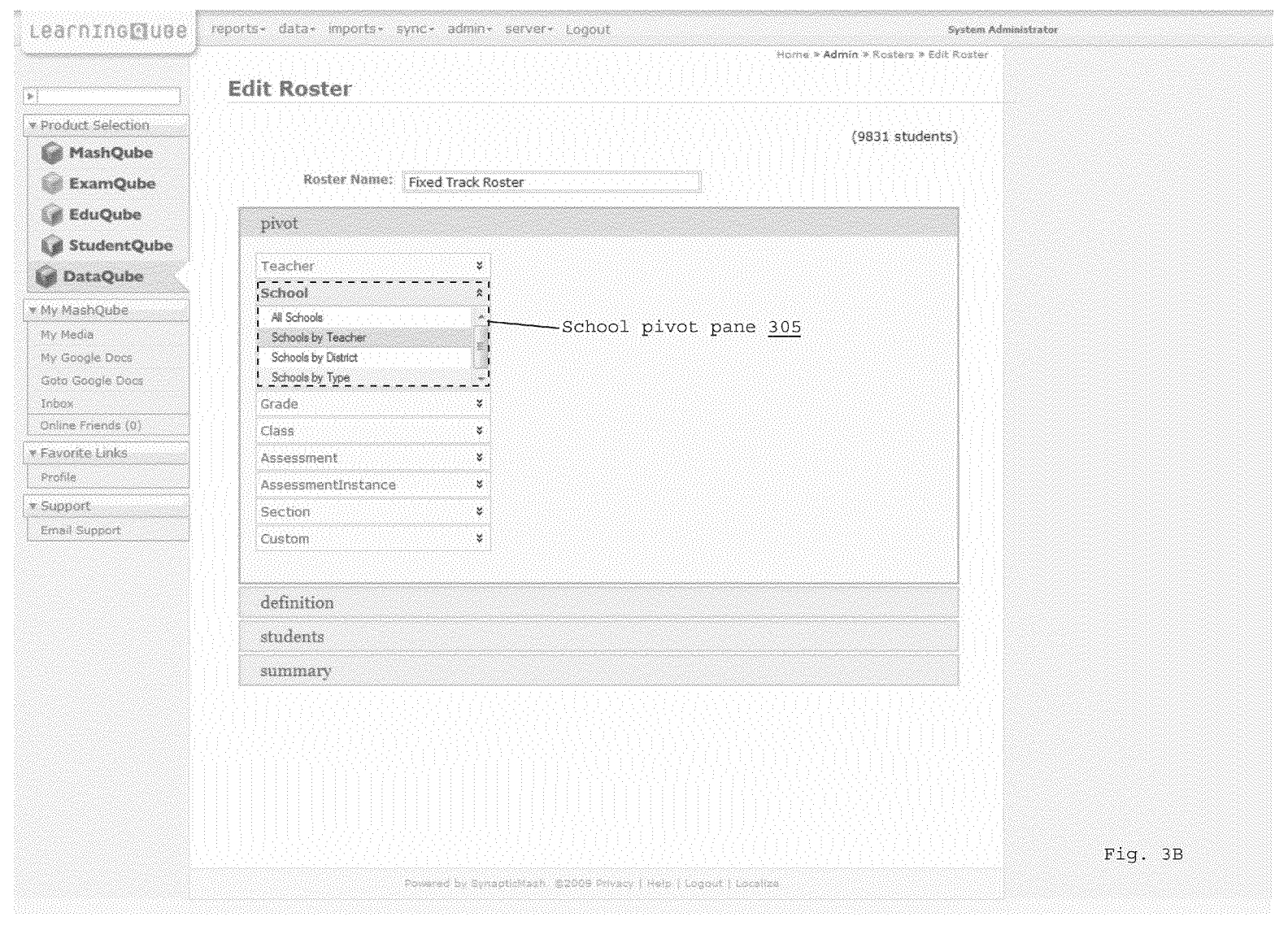

FIG. 3B illustrates one embodiment of UI 103 as rendered by RBA 104. In the illustrated embodiment, a user has clicked on the "school" link provided in pivot choice pane 303, causing school pivot pane 305 to open. In the illustrated embodiment, the user has selected "schools by teacher" from the selections provided in school pivot pane 305.

Figure 3C:
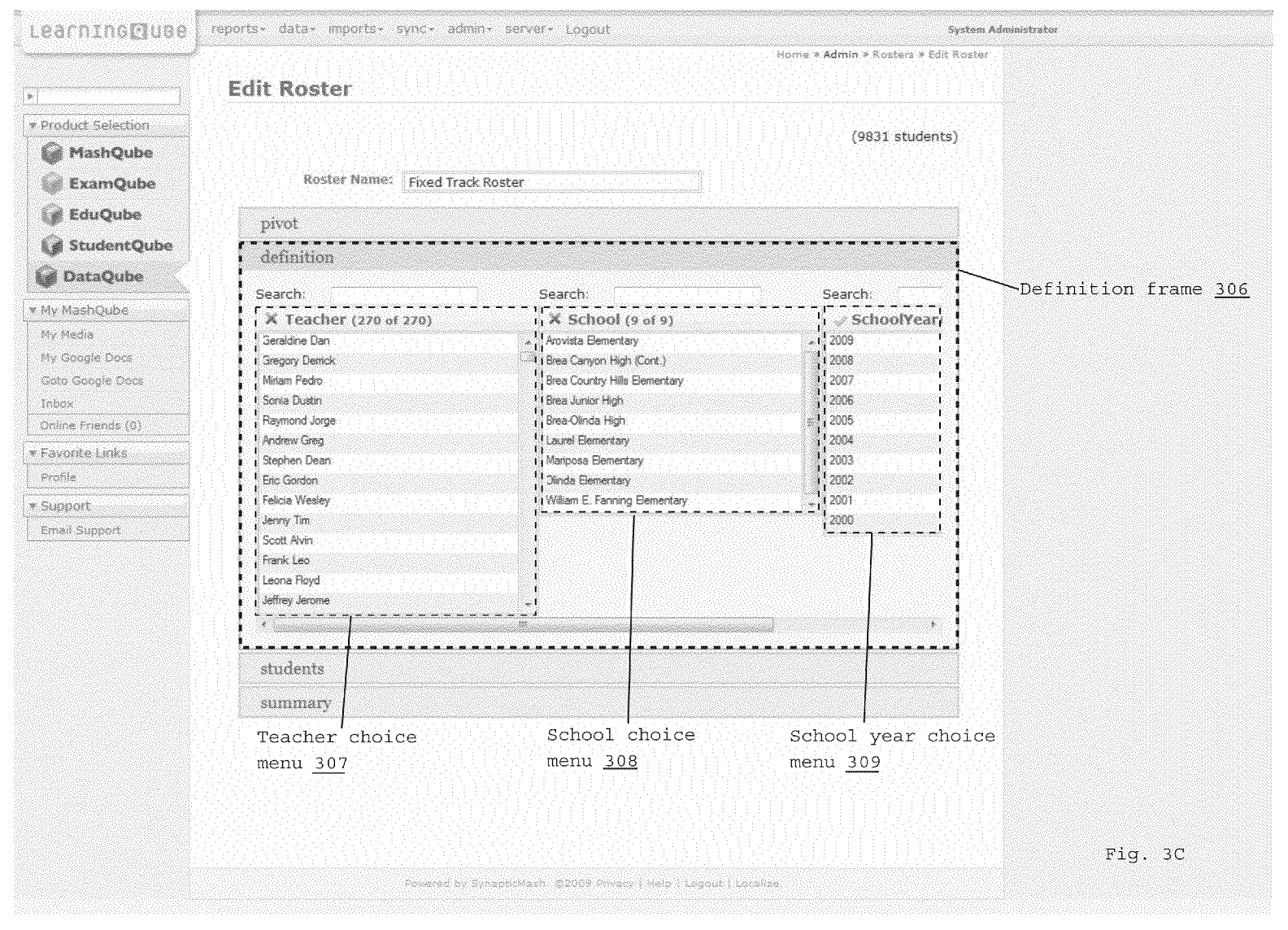

In FIG. 3C, there is illustrated one embodiment of UI 103 as rendered by RBA 104. In the embodiment shown, edit roster window 301 includes definition frame 306. Definition frame 306 may include one or more choice menus, each of the one or more choice menus being associated with its own respective entity. Each choice menu may display the list of one or more elements of the entity with which that particular choice menu is associated. As illustrated in FIG. 3C, definition frame 306 includes teacher choice menu 307, which displays the element set associated with teacher 212. Definition frame 306 further includes school choice menu 308, which displays the element set associated with school 106. Definition frame 306 further includes school year choice menu 309, which displays the element set associated with a collection of data (including but not limited to a data set or a data structure) which may be uniquely identified and which is related to one or more school years.

Figure 3D:
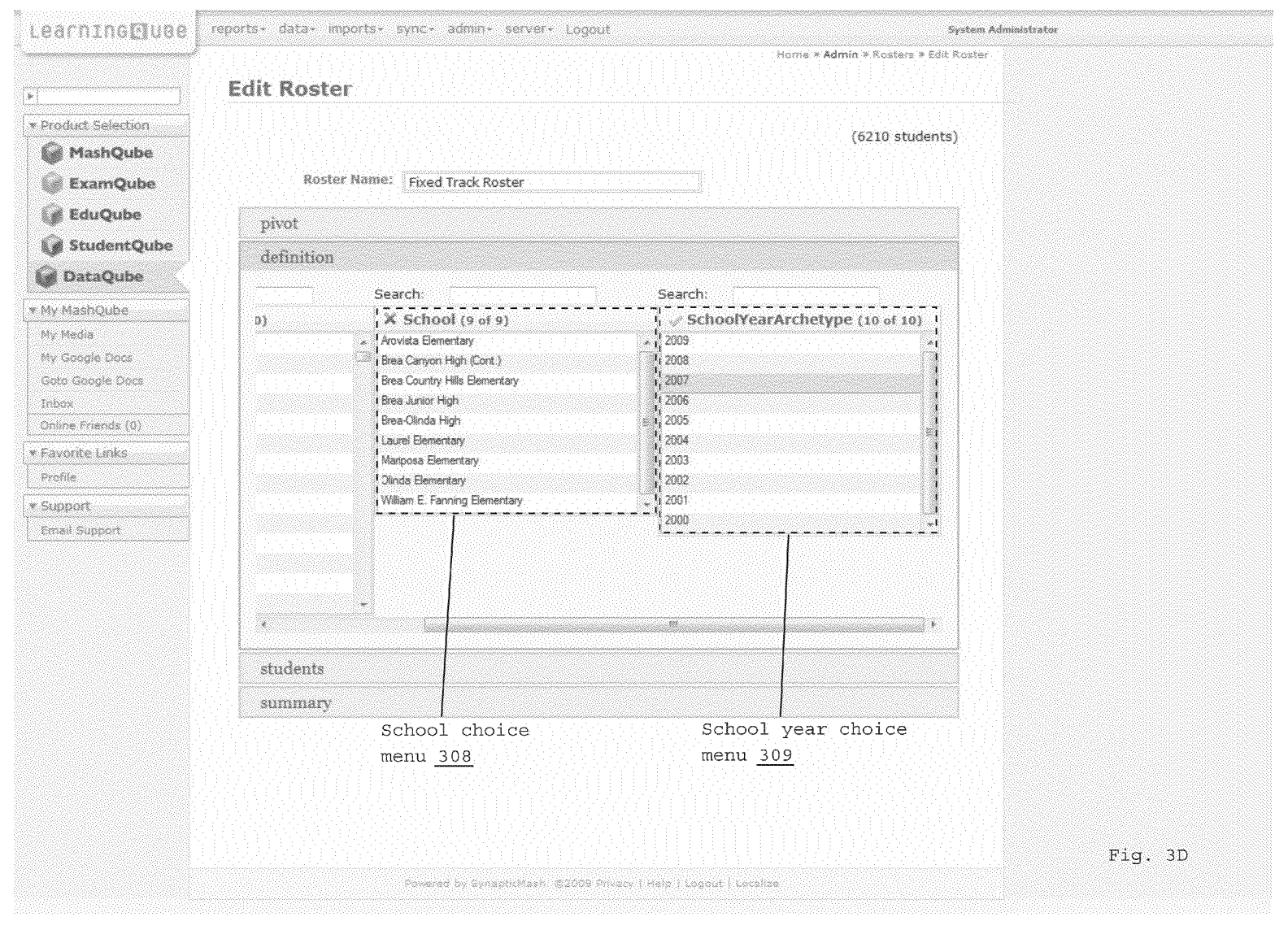

In FIG. 3D, there is illustrated one embodiment of UI 103 as rendered by RBA 104. FIG. 3D provides further details regarding school choice menu 308 and school year choice menu 309. In the illustrated embodiment, the user has selected "2007" from the selections provided in school year choice menu 309.

Figure 3E:
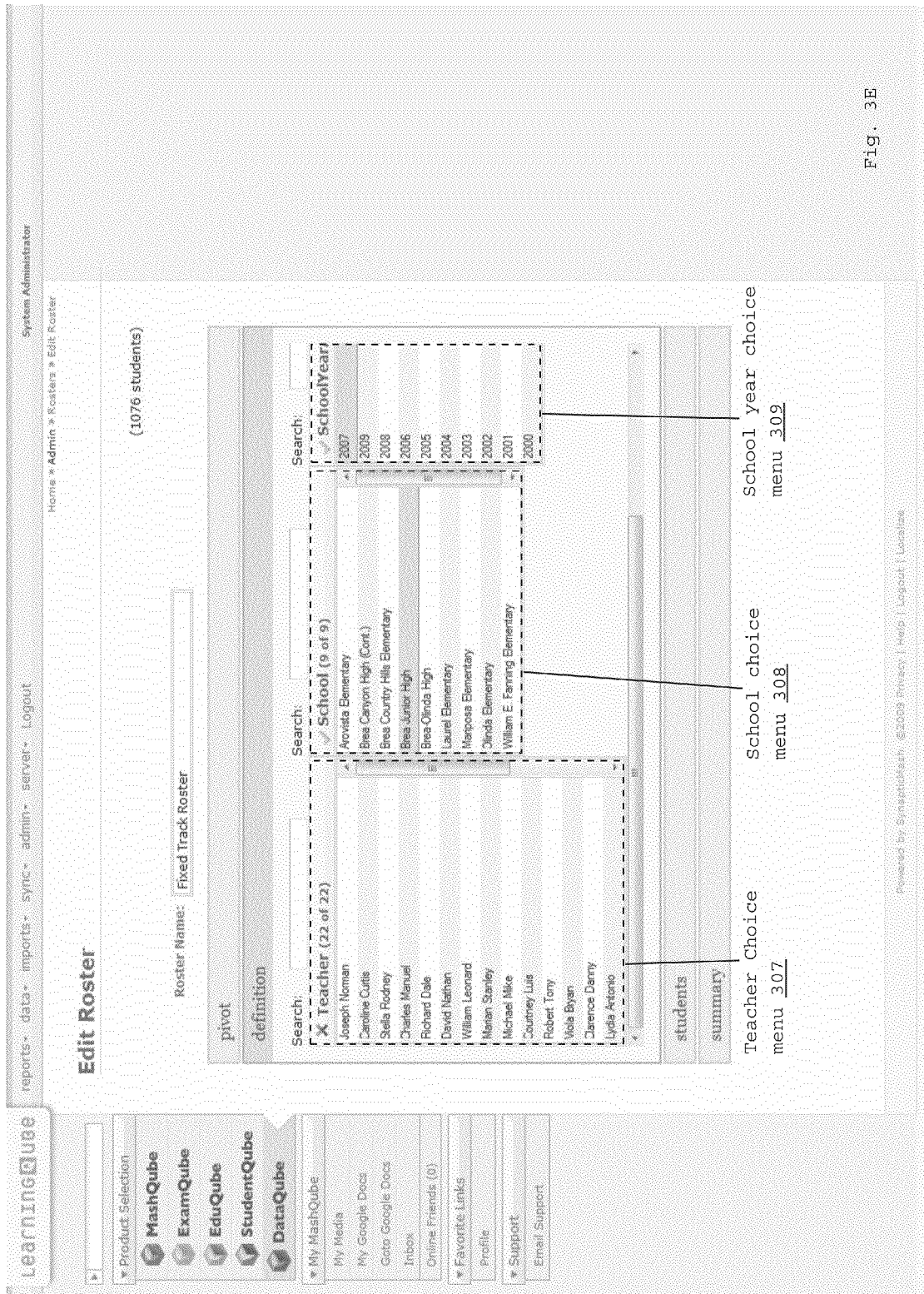

In FIG. 3E, there is illustrated one embodiment of UI 103 as rendered by RBA 104. FIG. 3E provides further details regarding teacher choice menu 307, school choice menu 308, and school year choice menu 309. In the illustrated embodiment, the user has selected "Brea Junior High" from the selections provided in school choice menu 308. In the embodiment shown, in response to the user's selection of "2007" and "Brea Junior High", RBA 104 has updated the displayed elements of teacher 212 within teacher choice menu 307, so that the displayed elements of teacher 212 within teacher choice menu 307 are limited to only those particular teachers who taught at Brea Junior High in the 2007 school year. Alternatively, if the user has selected "Brea Junior High" without selecting "2007", the displayed list of elements of teacher 212 within teacher choice menu 307 may be limited to those particular teachers who taught at Brea Junior High, without being further limited to teachers who taught at Brea Junior High in the 2007 school year.

FIG. 3F illustrates one embodiment of UI 103 as rendered by RBA 104. FIG. 3F provides further details regarding teacher choice menu 307, school choice menu 308, and school year choice menu 309. In the illustrated embodiment, two teachers (Caroline Curtis and Stella Rodney) have been selected from the displayed elements of teacher 212 within teacher choice menu 307. In one embodiment, upon the selection of Caroline Curtis and Stella Rodney from the displayed elements of teacher 212 within teacher choice menu 307, the displayed elements of school 206 within school choice menu 308 may be updated by RBA 104 to include only schools where the selected teachers have taught in the selected school year, in this case 2007.

FIG. 3G illustrates one embodiment of UI 103 as rendered by RBA 104. In the embodiment shown, edit roster window 301 includes student frame 310. Student frame 310 includes student metadata choice menu 311. Student metadata choice menu 311 may provide a choice of one or more filter options, in which the selection of one or more particular filter options narrows the data produced by the selection of i) one or more element sets and ii) one or more elements from the one or more element sets. In this case, without limitation, the data generated by the selections of "2007", "Brea Junior High", and "Caroline Curtis" and "Stella Rodney" may be filtered by selecting one of the choices provided in student race choice pane 312. In the embodiment shown, metadata reflecting each particular student's race is included within the data associated with that particular student in data 106. It is contemplated that any type of metadata may be used in connection with the filter options provided in student metadata choice menu 311.

Figure 3H:
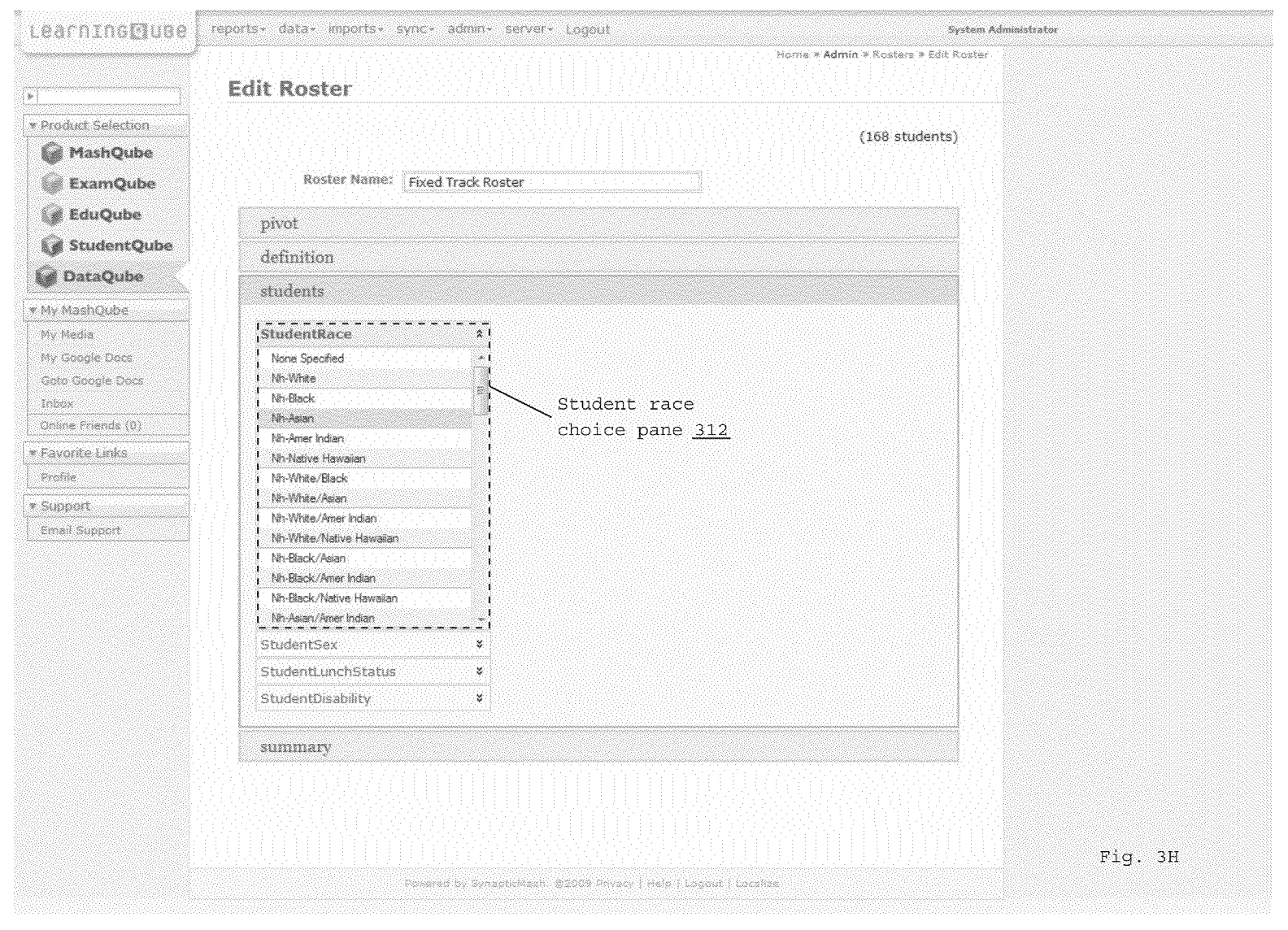

FIG. 3H illustrates one embodiment of UI 103 as rendered by RBA 104. In the embodiment shown, "Nh-Asian" has been selected from student race choice pane 312, indicating a desire to limit the previously-generated data (i.e., the data generated by the selections of "2007", "Brea Junior High", and "Caroline Curtis" and "Stella Rodney") to include only data which is related to Asian students.

Figure 3I:
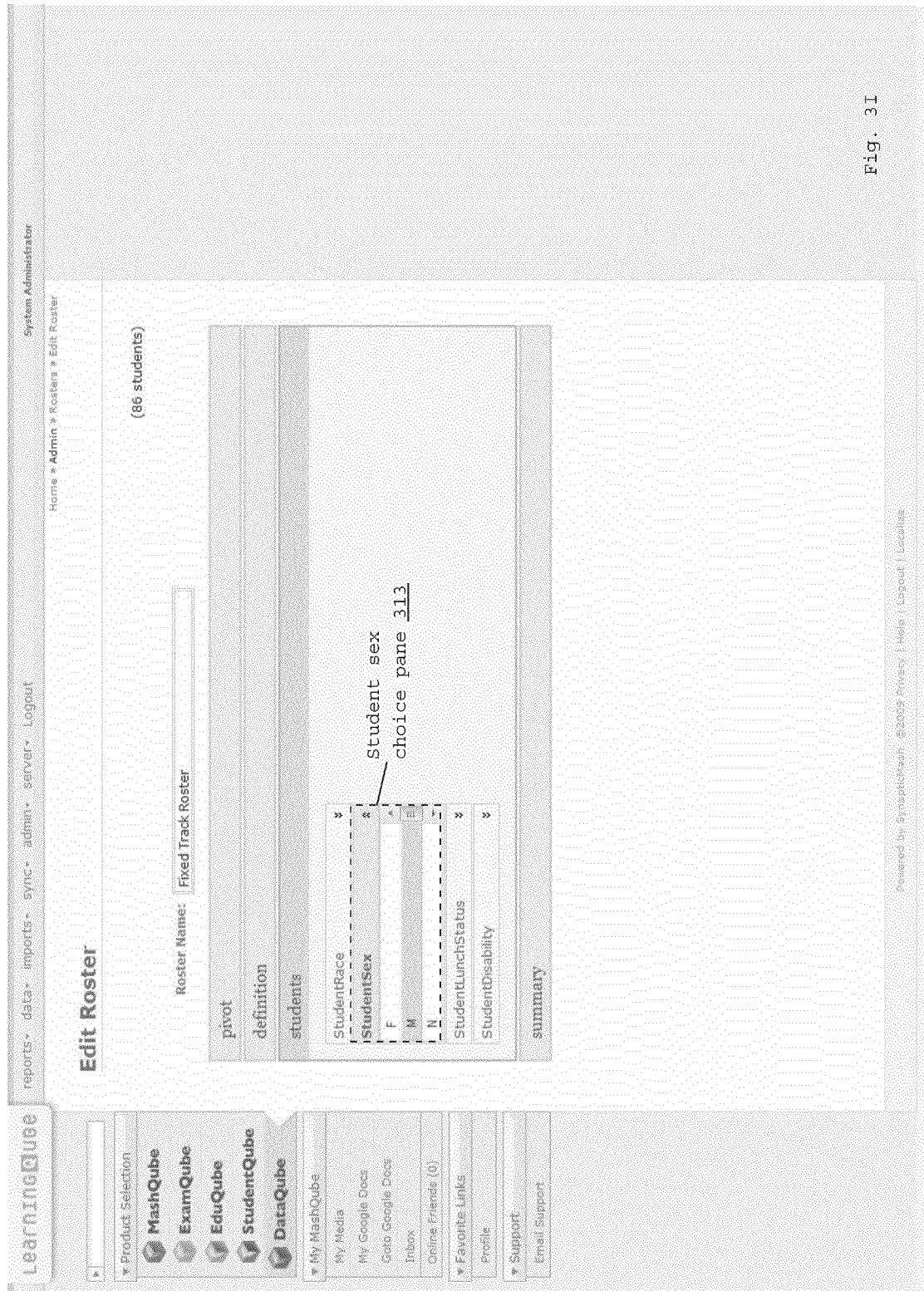

FIG. 3I illustrates one embodiment of UI 103 as rendered by RBA 104. In the embodiment shown, "M" has been selected from student sex choice pane 313, indicating a desire to limit the previously-generated data (i.e., the data generated by the selections of "2007", "Brea Junior High", "Caroline Curtis" and "Stella Rodney", and "Nh-Asian") to include only data which is related to male students.

FIG. 3J illustrates one embodiment of UI 103 as rendered by RBA 104. In the embodiment shown, edit roster window 301 includes summary frame 314. In the embodiment shown, RBA 104 has generated a roster which contains summary data, the summary data corresponding to i) the selection of one or more elements from teacher choice menu 307, school choice menu 308, and school year choice menu 309, as described above, and ii) the selection of one or more filter options—in this particular case, the selection of "Nh-Asian" from student race choice pane 312 and the selection of "M" from student sex choice pane 313. In the embodiment shown, the summary data is displayed in roster display 315. Roster display 315 indicates that there are no male Asian students who were taught by either Caroline Curtis or Stella Rodney at Brea Junior High in 2007 ("Student (0 selections)").

This example is only illustrative, and it is contemplated that RBA 104 may cause the contents of a second list of elements to be updated, in response to the selection of one or more elements from any first list of elements, to include only one or more elements that are associated with the one or more elements selected from the first list of elements. It is further contemplated that in response to the selection of one or more elements from a second list of elements, the contents of the first list may be updated to include only one or more elements that are associated with the one or more elements selected from the second list of elements. In similar fashion, RBA 104 may cause any list of elements to be updated in any fashion in response to the selection of one or more elements from any other list of elements. Further, RBA 104 may cause any list of elements to refrain from being updated in response to the selection of one or more elements from any other list of elements.

The roster generated by the present method, system, and product may be used for many purposes, including without limitation the generation of one or more reports; comparative analysis of academic results by teacher, school (or any other entity) to permit differentiated instruction, gap analysis, and to improve pedagogical efficacy and financial efficacy. In one example, a teacher may analyze a roster to obtain efficacy results for a specific curriculum subject with respect to a specific subset of her students (perhaps English as a Second Language learners). This analysis could provide data which indicates supplemental materials are necessary for this specific demographic. In another example and without limitation, a school district administrator may analyze one or more rosters to obtain efficacy results for English as a Second Language, broken down by school and demographic subset of students. This analysis could reveal which schools have successful remediation strategies for a particular demographic of students.

As an alternative to including student frame 314 within the present method, system, and product, there may be a "school frame", a "teacher frame", or any other desired type of frame reflecting the particular summary data desired by the user. It is contemplated that RBA 104 may generate one or more rosters through the use of pivot tables, filters, or any other software-based data processing tools.

Figure 4A:
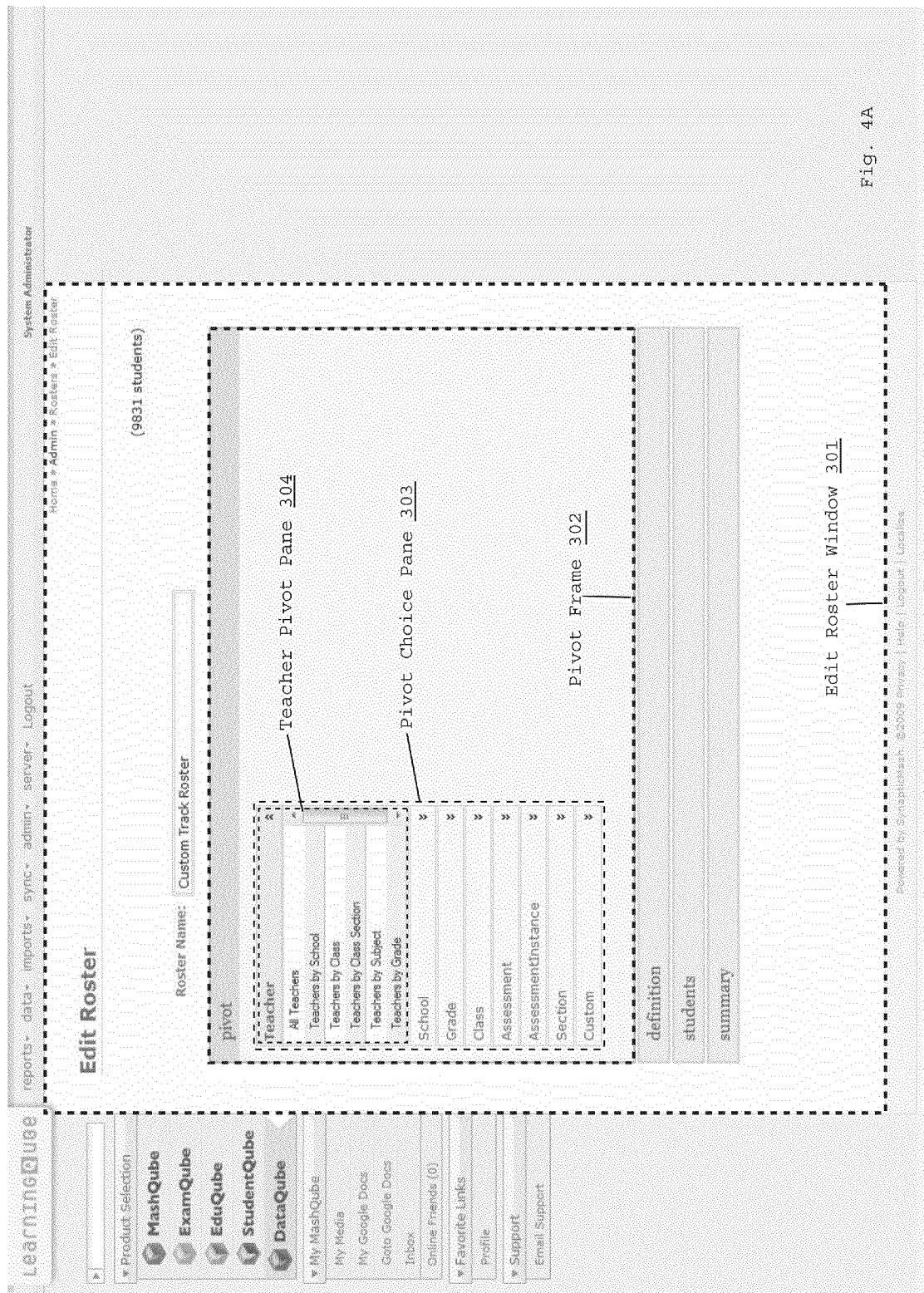

FIGS. 4A through 4L illustrate other representative embodiments of the present method, system, and product for building a roster via a user interface. In FIG. 4A, there is illustrated one embodiment of UI 103 as rendered by RBA 104. In the embodiment shown, there is provided an edit roster window 301. Edit roster window 301 includes pivot frame 302. Pivot frame 302 includes pivot choice pane 303. The various options provided in connection with pivot choice pane 303 allow a user, via UI 103, to pivot and/or join one or more element sets (or any other types of data sets) associated with one or more entities (as described in FIG. 2).

In the present embodiment, when a user clicks on the "teacher" link provided in pivot choice pane 303, teacher pivot pane 304 may open and provide a number of selections—for example and without limitation, "teachers by school", "teachers by class", etc. As illustrated in FIG. 4A, the selections provided in teacher pivot pane 304 include one or more fixed pivot sets. For example and without limitation, a user's selection of "teachers by school" may indicate a desire to build a roster from data associated with teacher 112 and school 106.

Figure 4B:
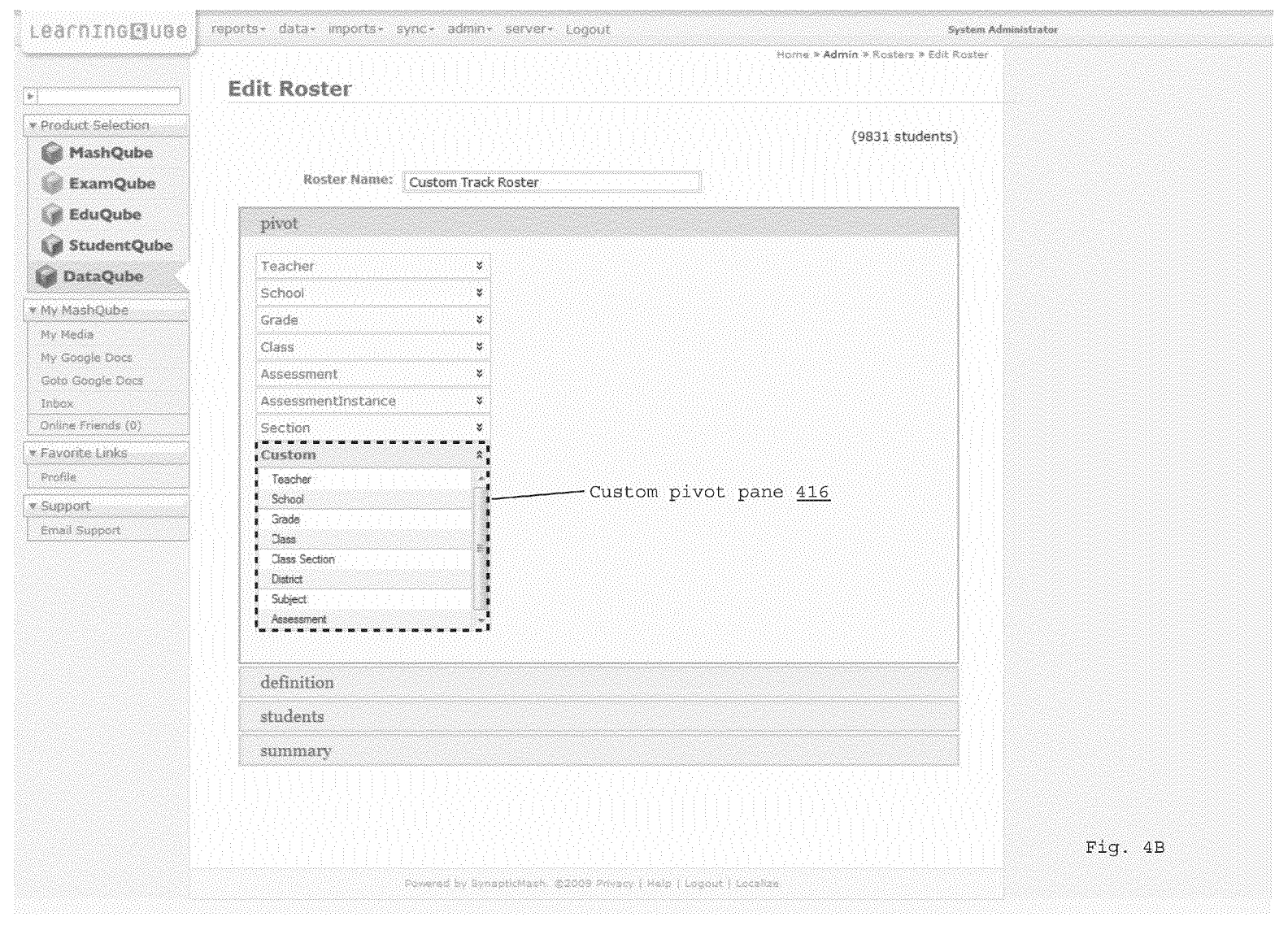

FIG. 4B illustrates one embodiment of UI 103 as rendered by RBA 104. In the illustrated embodiment, a user has clicked on the "custom" link provided in pivot choice pane 303, causing custom pivot pane 416 to open. As illustrated in FIG. 4B, the selections provided in custom pivot pane 416 include one or more entities. The options provided in custom pivot pane 416 may allow a user to indicate a desire to build a roster from data associated with the selected group of entities without the use of one or more fixed pivot sets (in contrast to the embodiment shown in FIG. 3B).

Figure 4C:
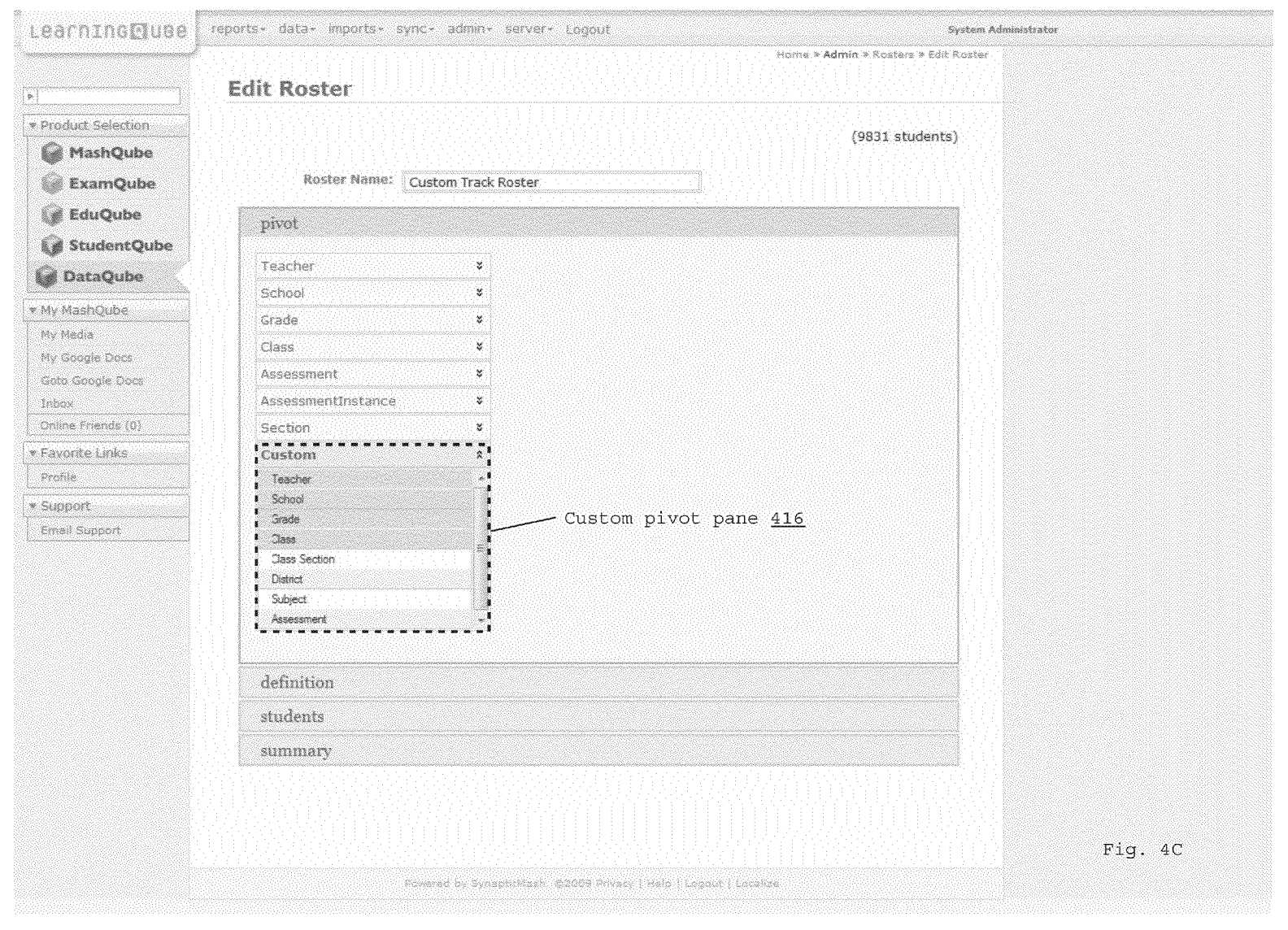

In FIG. 4C, there is illustrated one embodiment of UI 103 as rendered by RBA 104. In the illustrated embodiment, the user has selected "teacher", "school", "grade" and "class" from the selections provided in school pivot pane 305. In the embodiment shown, this indicates a desire to generate a roster from data associated with teacher 212, school 206, grade 204, and class 209.

Figure 4D:
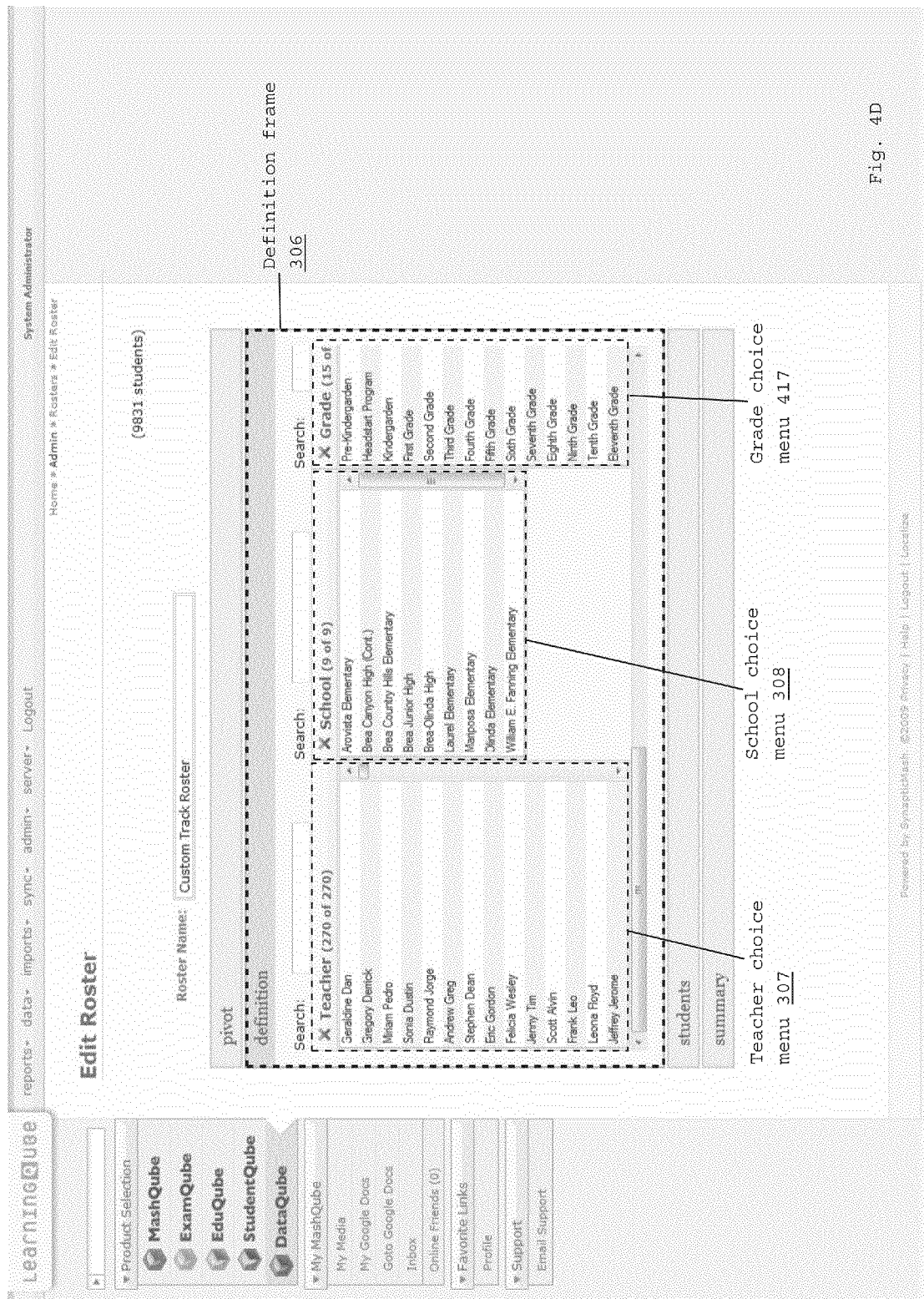

In FIG. 4D, there is illustrated one embodiment of UI 103 as rendered by RBA 104. In the embodiment shown, edit roster window 301 includes definition frame 306. Definition frame 306 may include one or more choice menus, each of the one or more choice menus being associated with its own respective entity. As illustrated in FIG. 3C, definition frame 306 includes teacher choice menu 307, which displays the element set associated with teacher 212. Definition frame 306 further includes school choice menu 308, which displays the element set associated with school 206. Definition frame 306 further includes grade choice menu 417, which displays the element set associated with grade 204.

Figure 4E:
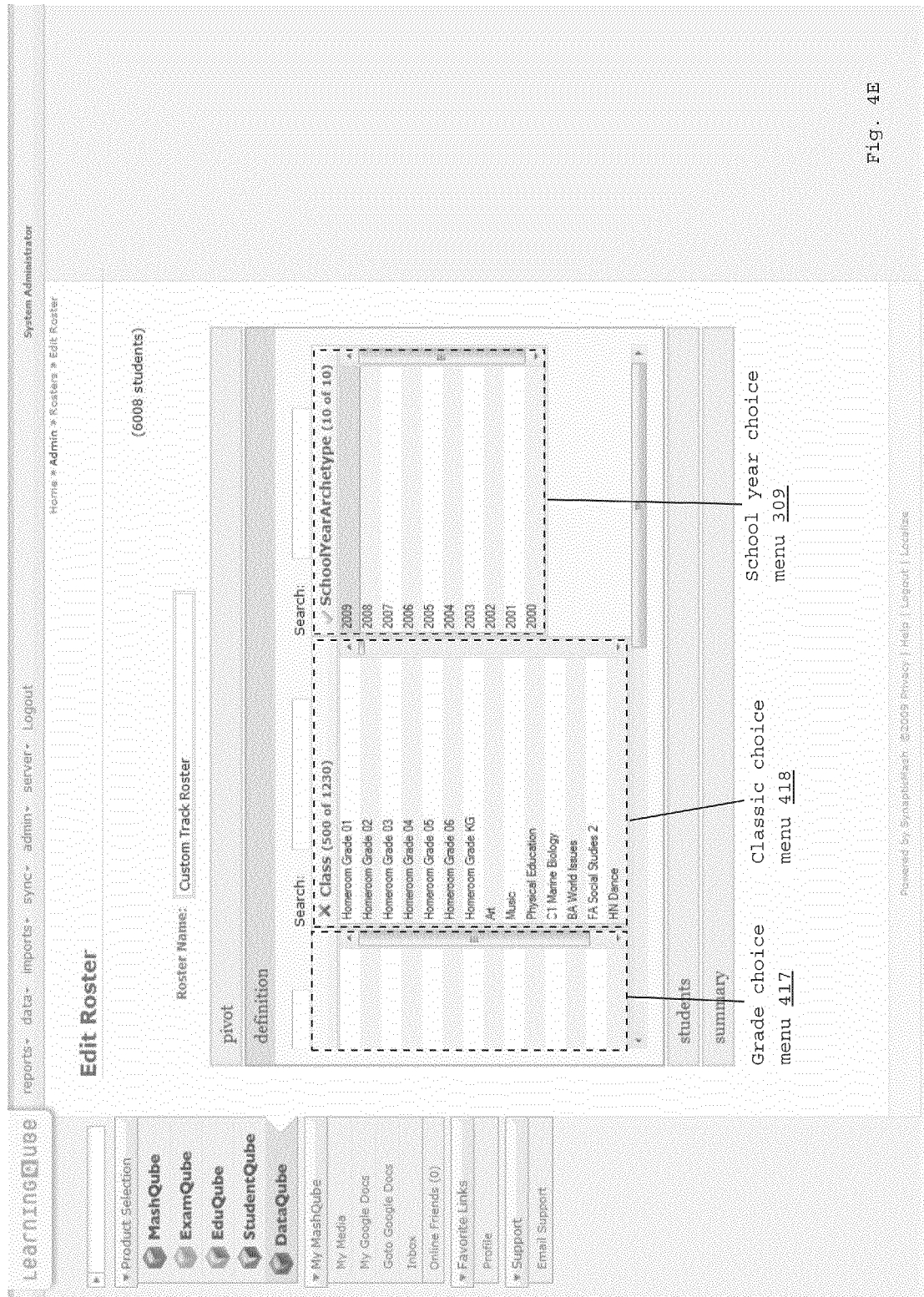

In FIG. 4E, there is illustrated one embodiment of UI 103 as rendered by RBA 104. FIG. 4E provides further details regarding grade choice menu 417. FIG. 4E further illustrates class choice menu 418, which displays the element set associated with class 209. FIG. 4E further illustrates school year choice menu 309, which displays the element set associated with a collection of data (including but not limited to a data set or a data structure) which may be uniquely identified and which is related to one or more school years. In the illustrated embodiment, the user has selected "2009" from the selections provided in school year choice menu 309.

Figure 4F:
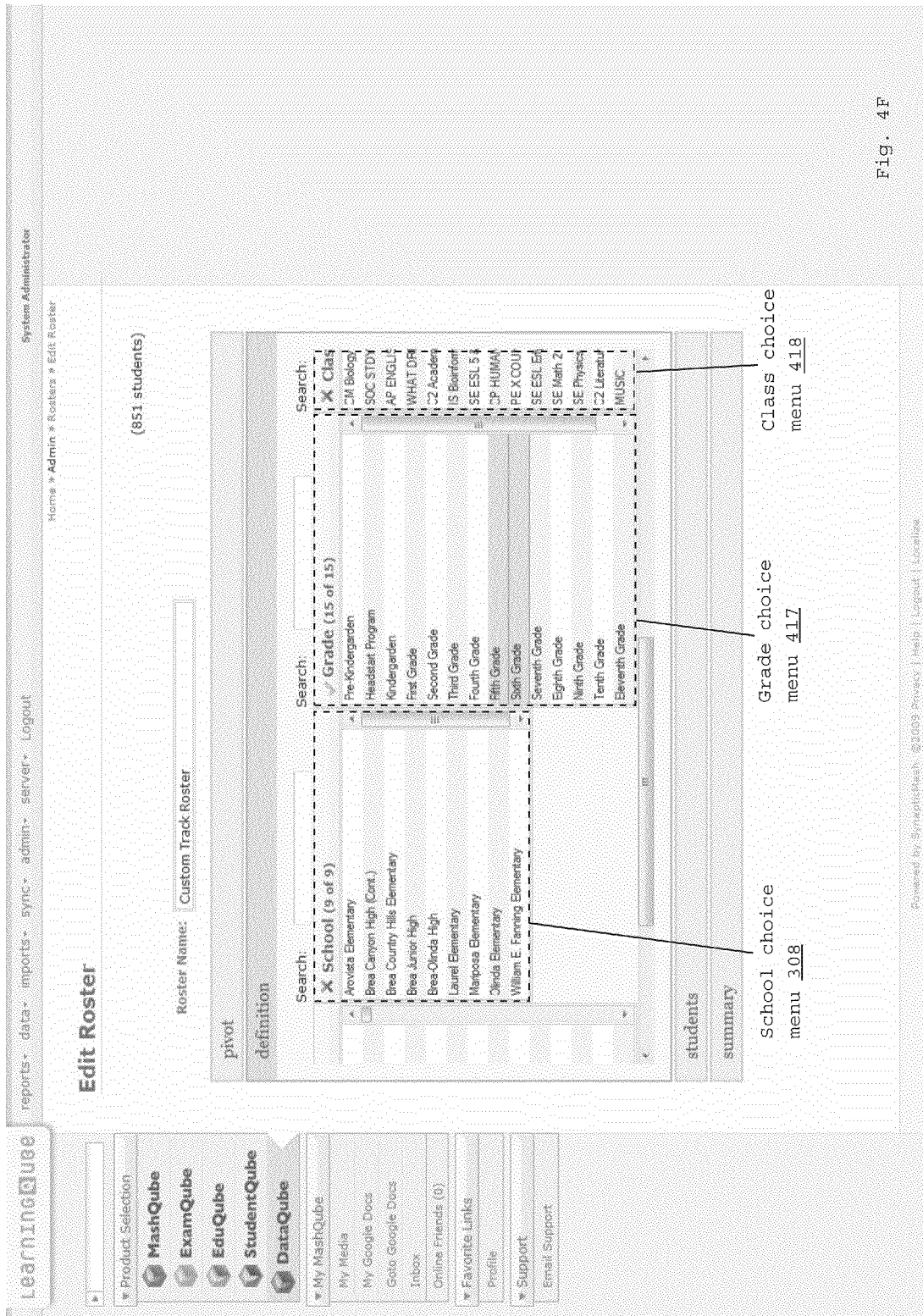

In FIG. 4F, there is illustrated one embodiment of UI 103 as rendered by RBA 104. FIG. 4F provides further details regarding school choice menu 308, grade choice menu 417, and class choice menu 418. In the illustrated embodiment, the user has selected "Fifth Grade" and "Sixth Grade" from the selections provided in grade choice menu 417.

Figure 4G:
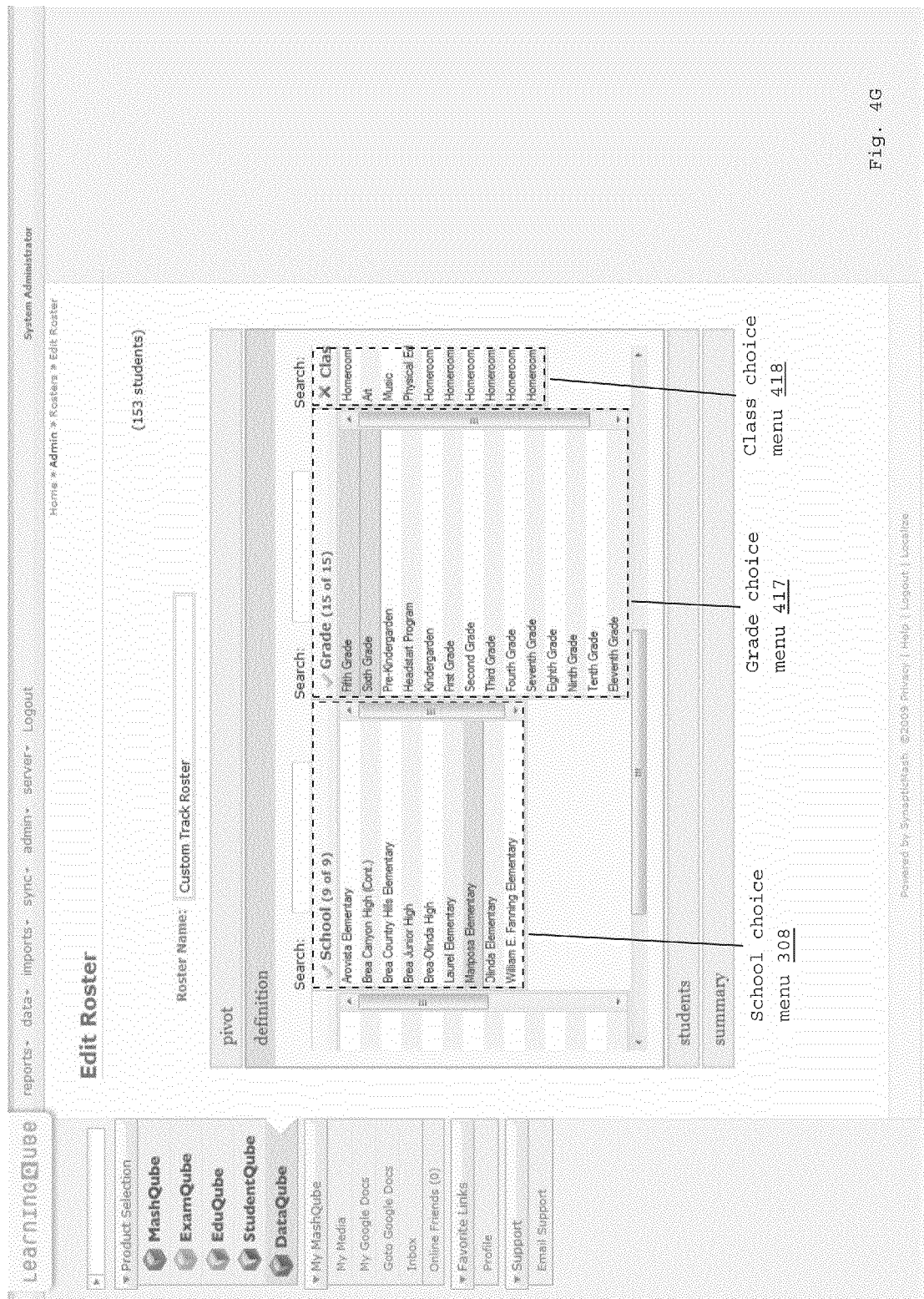

In FIG. 4G, there is illustrated one embodiment of UI 103 as rendered by RBA 104. FIG. 4G provides further details regarding school choice menu 308, grade choice menu 417, and class choice menu 418. In the illustrated embodiment, the user has selected "Mariposa Elementary" from the selections provided in school choice menu 308. In the embodiment shown, in response to the user's selection of "Fifth Grade", "Sixth Grade", and "Mariposa Elementary" RBA 104 has updated the displayed elements of class 209 within class choice menu 418, so that the displayed elements of class 209 within class choice menu 418 are limited to only those particular classes offered at Mariposa Elementary, in the fifth and/or sixth grades, for the school year 2009.

It is contemplated that RBA 104 may cause the displayed elements of any particular entity list to be updated in accordance with the selection of one or more displayed elements of any other particular entity list. For example and without limitation, the selection of one or more grades within grade choice menu 417 may cause the displayed elements of school choice menu 308 to reflect only the schools where students in those grades are present. In one example, the selection of "fifth grade" and "sixth grade" from class choice menu 418 may cause the displayed elements of school choice menu 308 to reflect only elementary schools, i.e., schools where fifth and sixth grade classes are offered. In another example, the selection of "Mariposa Elementary" from school choice menu 308 may cause the displayed elements of teacher choice menu 307 to reflect only teachers at Mariposa Elementary. It is contemplated that the selection of elements from one entity list, and the consequent limitation of elements from one or more other entity lists, may be in any order as designated by an algorithm associated with RBA 104.

Figure 4H:
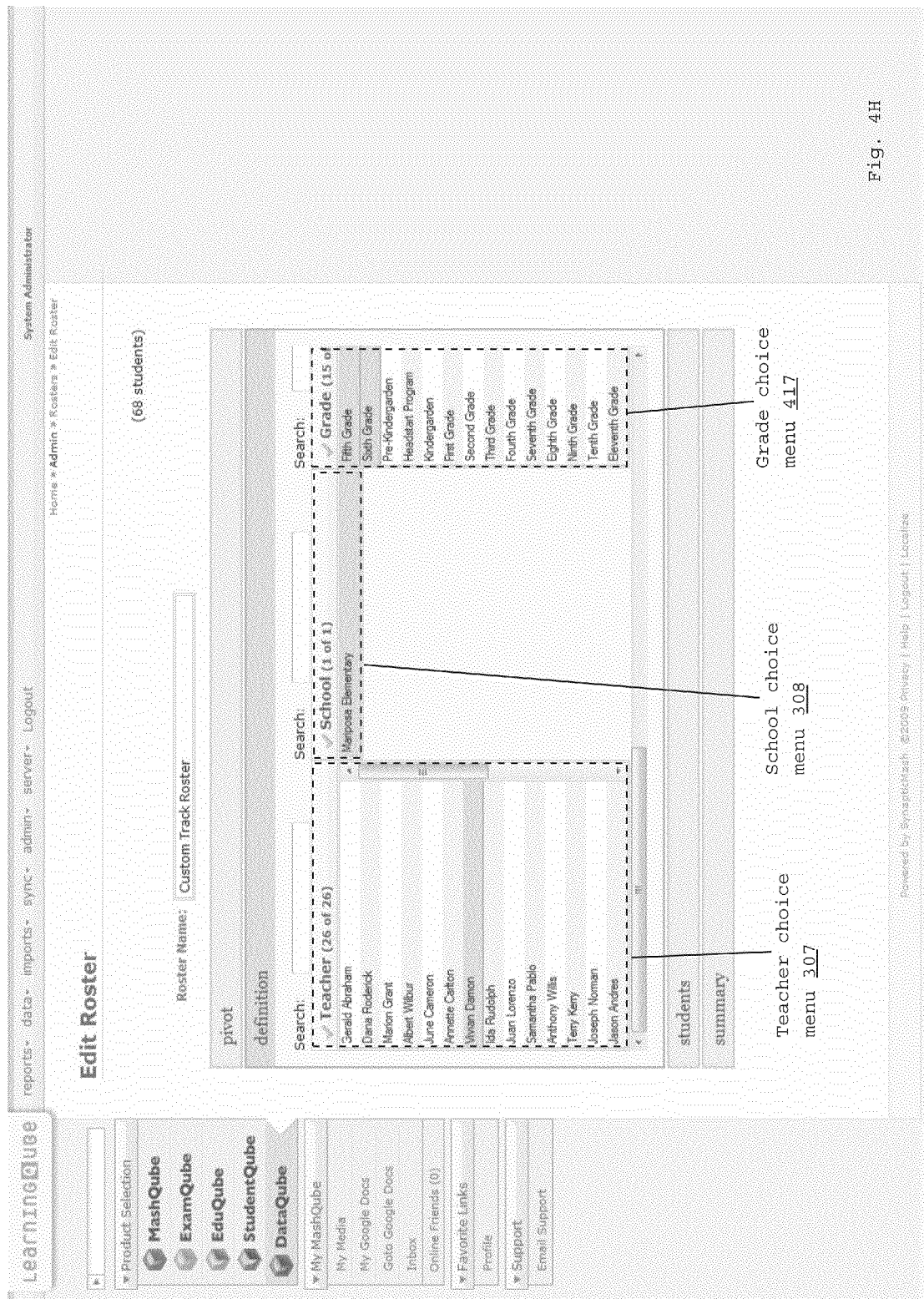

FIG. 4H illustrates one embodiment of UI 103 as rendered by RBA 104. FIG. 4H provides further details regarding teacher choice menu 307, school choice menu 308, and grade choice menu 417. In the illustrated embodiment, one teacher (Vivian Damon) has been selected from the displayed elements of teacher 212 within teacher choice menu 307. In one embodiment, upon the selection of Vivian Damon (or another particular teacher) from the displayed elements of teacher 212 within teacher choice menu 307, the displayed elements of school 206 within school choice menu 308 may be updated by RBA 104 to include only schools where the selected teacher has taught in the selected school year, in this case 2009.

Figure 4I:
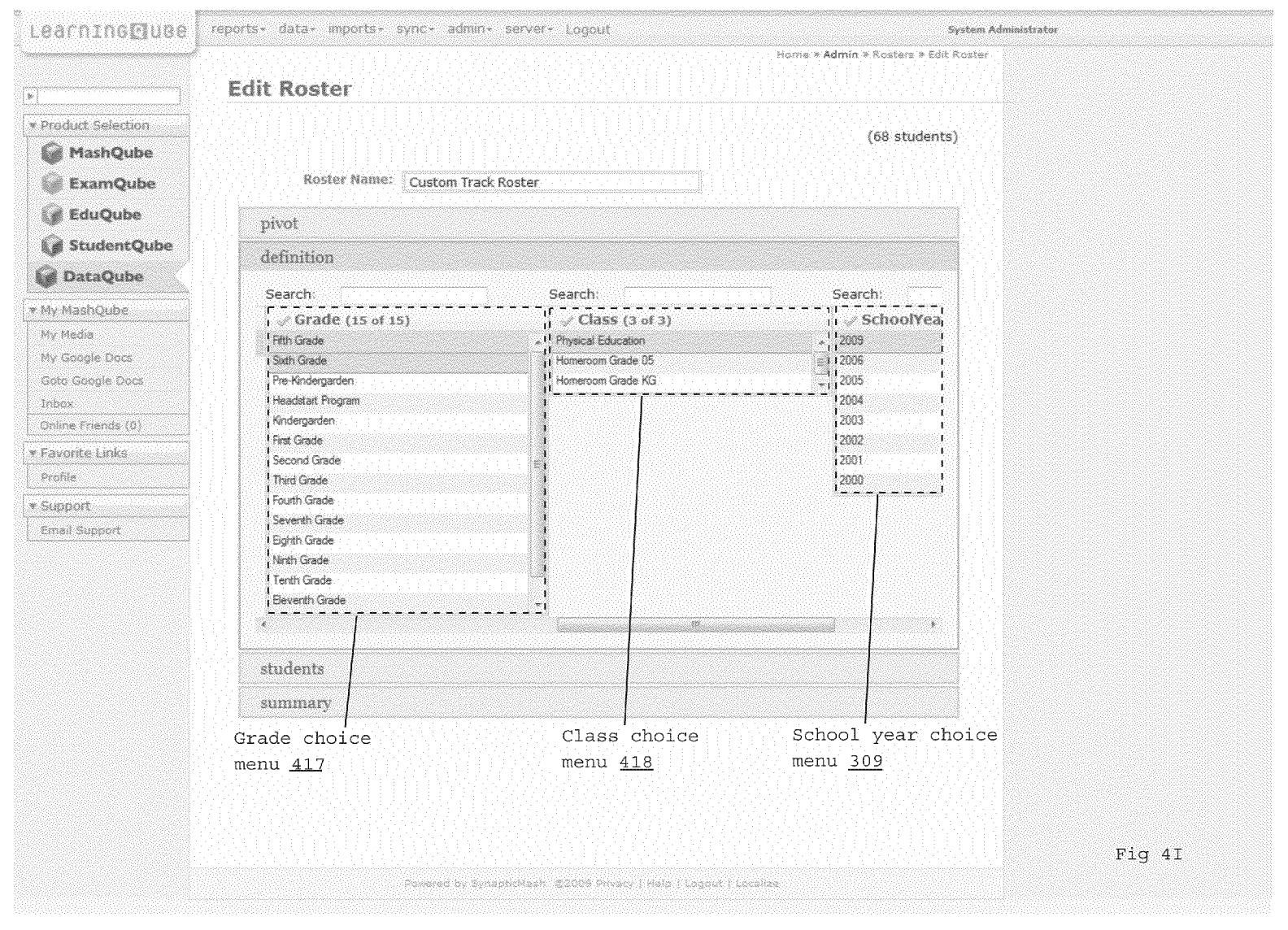

FIG. 4I illustrates one embodiment of UI 103 as rendered by RBA 104. FIG. 4I provides further details regarding grade choice menu 417, class choice menu 418, and school year choice menu 309. As indicated in this embodiment, the displayed elements of class 209 within class choice menu 418 have been updated by RBA 104 to reflect only the classes taught by Vivian Damon at Mariposa Elementary in 2009. In the illustrated embodiment, the user has selected "Physical Education" from the selections provided in class choice menu 418.

Figure 4J:
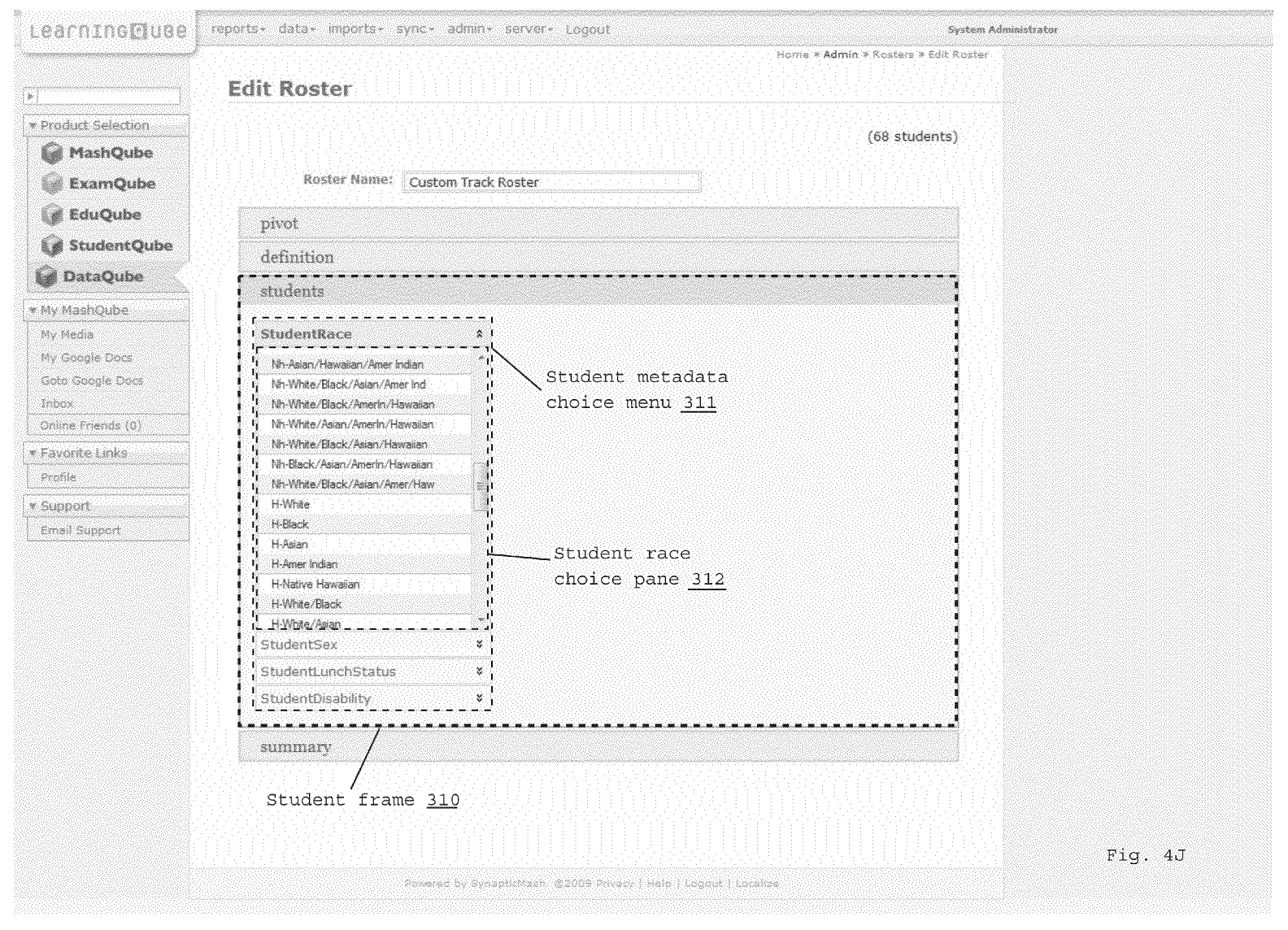

FIG. 4J illustrates one embodiment of UI 103 as rendered by RBA 104. In the embodiment shown, edit roster window 301 includes student frame 310. Student frame 310 includes student metadata choice menu 311. Student metadata choice menu 311 may provide a choice of one or more filter options, in which the selection of one or more particular filter options narrows the data produced by the selection of i) one or more element sets and ii) one or more elements from the one or more element sets. In this case, without limitation, the data generated by the selections of "2009", "Fifth Grade", "Sixth Grade", "Vivian Damon", "Mariposa Elementary", and "Physical Education" may be filtered by selecting one of the choices provided in student race choice pane 312. In the embodiment shown, metadata reflecting each particular student's race is included within the data associated with that particular student in data 106. It is contemplated that any type of metadata may be used in connection with the filter options provided in student metadata choice menu 311.

Figure 4K:
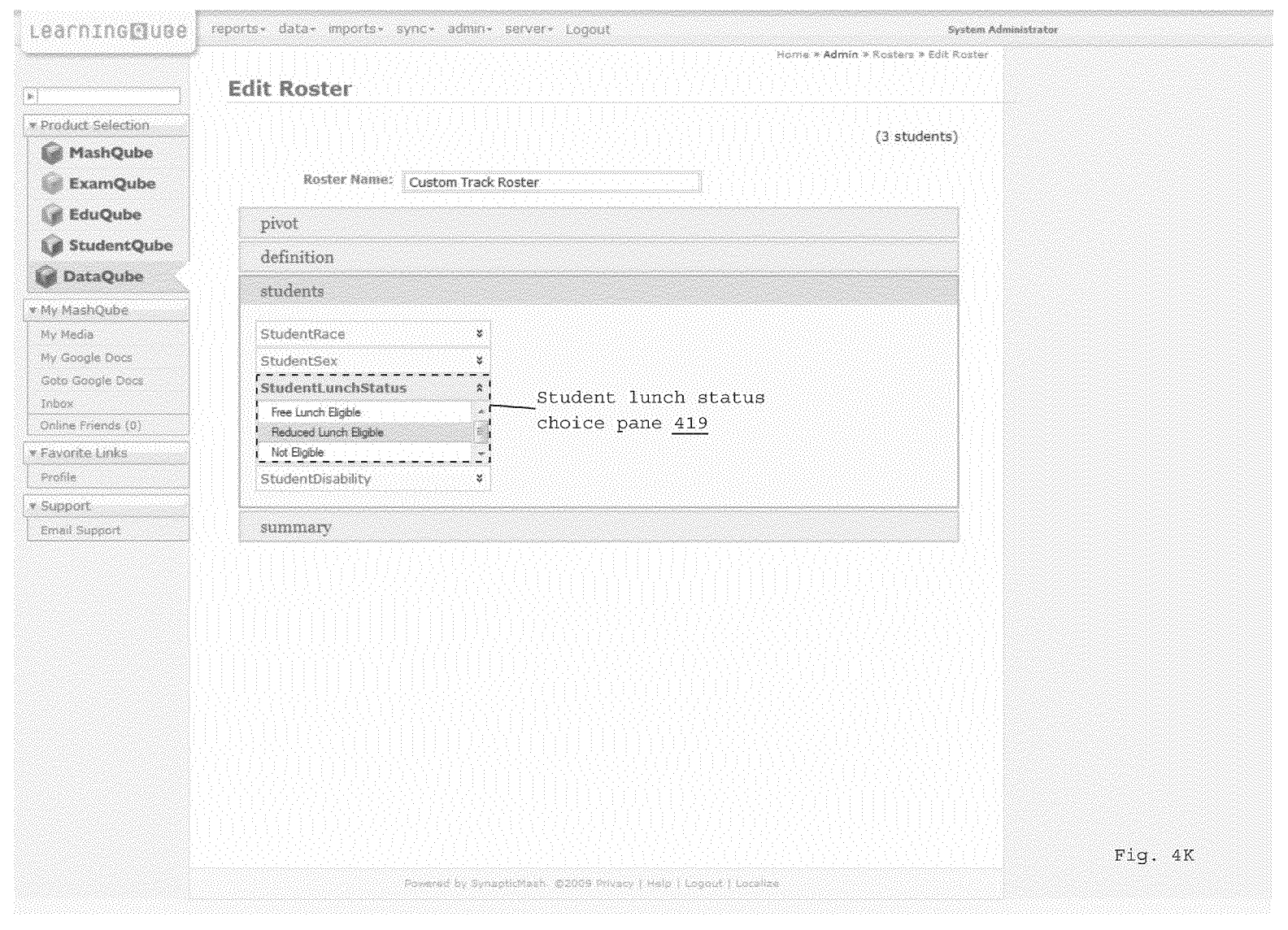

FIG. 4K illustrates one embodiment of UI 103 as rendered by RBA 104. In the embodiment shown, a user has clicked on the "StudentLunchStatus" link provided in student metadata choice menu 311, causing student lunch status choice pane 419 to open. "Reduced lunch eligible" has been selected from student lunch status choice pane 419, indicating a desire to limit the previously-generated data (i.e., the data generated by the selections of "2009", "Fifth Grade", "Sixth Grade", "Vivian Damon", "Mariposa Elementary", and "Physical Education") to include only data which is related to students who are eligible for reduced-price lunches.

FIG. 4L illustrates one embodiment of UI 103 as rendered by RBA 104. In the embodiment shown, edit roster window 301 includes summary frame 314. In the embodiment shown, RBA 104 has generated a roster which contains summary data, the summary data corresponding to i) the selection of one or more elements from one or more element sets, as described above, and ii) the selection of one or more filter options. In the embodiment shown, the summary data is displayed in roster display 315. Roster display 315 indicates that there are no fifth- or sixth-grade students who are eligible for reduced-price lunches and were taught Physical Education by Vivian Damon at Mariposa Elementary in 2009 ("Student (0 selections)").

Figure 5:
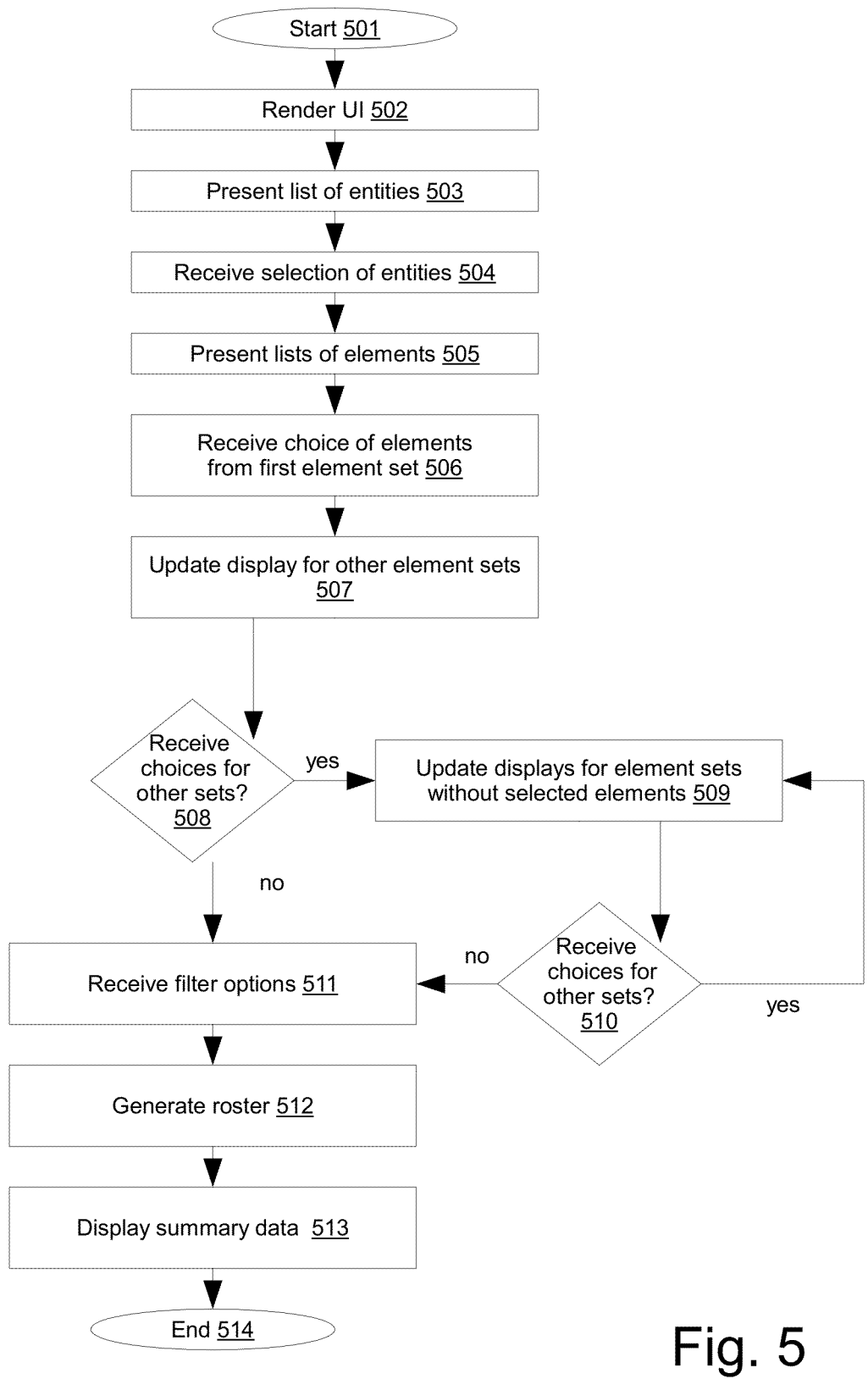
FIG. 5 illustrates by way of a schematic flow diagram another embodiment of the present method, system, and product for building a roster via a user interface.

FIG. 5 illustrates by way of a schematic flow diagram another embodiment of the present method, system, and product for building a roster via a user interface. It is contemplated that all steps described in connection with FIG. 5 (or any other methods described herein) may be performed by RBA 104 in response to data transmitted to RBA 104 via UI 103 (without limitation, the data transmitted to RBA 104 may include a selection of one or more element sets in a data structure, and may further include a selection of one or more elements from one or more of the selected element sets). The process starts at step 501. At step 502, UI 103 is rendered at display terminal 101. At step 503, RBA 104 presents a list of entities at display terminal 101 via UI 103. At step 504, RBA 104 may receive a selection of one or more entities. Without limitation, the selection received at step 504 may be the selection of the "schools by teacher" pivot set in school pivot pane 305 as described in FIG. 3B.

At step 505, the element sets corresponding to the selected entities may be presented via UI 103. The selected element sets may include any element sets which RBA 104 is programmed to present in response to a particular user selection. For example and without limitation, the selection of "schools by teacher" may cause school year choice menu 309 to be displayed as well as causing teacher choice menu 307 and school choice menu 308 to be displayed.

At step 506, the choice of one or more elements from a first element set is received. As an illustrative example and without limitation, the received choice may be "Brea Junior High" from the selections provided in school choice menu 308. Alternatively, at step 506, one or more choices of elements from one or more element sets may be received.

At step 507, the displayed elements of one or more element sets are updated in response to the choice of one or more elements from the first element set. As an illustrative example and without limitation, in response to the choice of "Brea Junior High" from the selections provided in school choice menu 308, RBA 104 may update the displayed elements of teacher 212 within teacher choice menu 307, so that the displayed elements of teacher 212 within teacher choice menu 307 are limited to only those particular teachers who taught at Brea Junior High.

At step 508, if the choice of one or more elements from a second element set is received, then at step 509 the displayed elements of one or more other element sets are updated in response to the choice of one or more elements from the second element set. In the embodiment shown, if one or more elements in a first element set have been selected, the elements in the first element set may not be updated in response to the selection of elements in other element sets. In similar fashion (and merely as an illustrative example), other element sets may not be updated if elements within those element sets have been selected. Alternatively, the elements of any element set may be updated in response to the selection of one or more elements in any other element set.

At step 510, if the choice of one or more elements from a third element set is received, then the process returns to step 509 and the displayed elements of one or more other element sets are updated in response to the choice of one or more elements from the third element set. Steps 510 and 509 may repeat as necessary in response to the choice of one or more items from a fourth element set through an nth element set.

If, at step 510, the choice of one or more elements from a third element set (or, alternatively, for a fourth through nth element set) is not received, the process continues at step 511. Similarly, if at step 508 the choice of one or more elements from a second element set is not received, the process continues at step 511.

At step 511, one or more filter options are received. At step 512, RBA 104 generates a roster which includes summary data in accordance with the received i) selection of elements from one or more element sets and ii) selection of one or more filter options. Alternatively, RBA 104 may receive an indication at step 511 that no filter options are desired, in which event the process may proceed to step 512. In another alternative, step 511 may be omitted in the event filter options are not provided by RBA 104. It is contemplated that RBA 104 may store the roster in data store 105 or another data store.

At step 513, RBA 104 may cause the summary data associated with the roster to be displayed in roster display 315. At step 514, the process ends.

It is contemplated that elements may be "sticky"; that is, if one or more particular elements are selected, those particular elements may remain in view and may not disappear from view in response to the selection of one or more other elements. For example and without limitation, in one embodiment, upon a user's selection of one or more elements from a first list of elements, RBA 104 may refrain from revising the displayed elements in the first list of elements in response to the selection of one or more elements in one or more other lists of elements. It is further contemplated that element sets may be "sticky"; that is, if one or more elements from a particular element set are selected, the selected one or more elements may remain in view and may not disappear from view in response to the selection of one or more elements from one or more other element sets. Similarly, elements and/or element sets may not be "sticky", in which event they may disappear from view in response to the selection of one or more elements from one or more other element sets.

It is also contemplated that, in response to the de-selection of one or more elements in any particular element set (i.e., the user's indication, after selecting the one or more elements in the particular element set, that the user does not wish to select those one or more elements), the elements in any other element set may may be updated to reflect the de-selection of the one or more elements in the particular element set.

It is further contemplated that RBA 104 may create a roster at or near the beginning of the process described in FIG. 5. For example and without limitation, RBA 104 may create a roster at step 502 or step 503, and may update the roster throughout the process in response to user selections. It is also contemplated that elements within one or more element sets may be ordered in response to user preference; for example and without limitation, elements may be ordered alphabetically or in accordance with the locations of the elements within one or more element sets.

It is also contemplated that RBA 104 may receive one or more updates from data store 105 or any other data store, each of the one or more updates comprising new summary data. For each update RBA 104 may then generate a new roster (i.e., a updated version of the most recently created roster for the combination of data which is the current subject of interest) which includes the new summary data. RBA may display the summary data from the new roster in the user interface.

It is further contemplated that RBA 104 may allow any particular selection of element sets, elements, and/or filter options (a "search") to be stored in memory for later retrieval and use. For example and without limitation, RBA 104 may permit the storage of a search which results in the generation of a roster of all English students in East High School who have performed above a specified threshold on an assessment which measures knowledge relating to the calculation of the areas of geometrical figures. RBA 104 may permit a user to store this search in memory as a "favorite". RBA 104 may subsequently use the search to generate a new roster which contains updated information relating to one or more students who meet the criteria specified in the search. This may allow the intelligent creation of dynamic multi-year and multi-class cohorts within the user's privilege level. The summary data produced by any particular search may change over time, e.g., the returned results for today's search next year may be different, and may be dynamically updated. For example, identical searches for male Asian students in a particular school may result in three names next year, in contrast to two this year.

It is also contemplated that one or more rosters may be imported from external sources, such as XML, CSV, or Excel files. The imported rosters may be stored in data store 105 and used by RBA 104 in accordance with the present method, system, and product.

As will be appreciated by those persons skilled in the art, the present inventive method, system, and product, inclusive of one or more embodiments of its operation through software and hardware systems and the like, affords distinct advantages not previously available to schools and other organizations relating to the rendering of a dynamic graphical roster building interface. The described method, system, and product may allow users to create complex sets of relational information without having to comprehend statistical concepts like pivot, direct and indirect effects, endogenous and exogenous variables or regressions.

Without limitation, the described method, system, and product may be used to generate a roster with summary data indicating the effectiveness of one or more objects within a curriculum with respect to a specific subset of students (e.g., ESL learners). This can provide data which indicates particular supplemental materials are necessary for this specific demographic.

As a further example, the described method, system, and product may be used to generate a roster with summary data indicating the effectiveness of one or more objects and/or items within a curriculum broken down by school and demographic subset of students. This may reveal schools which have successful remediation strategies for a particular demographic.

The described method, system, and product may also be used to analyze and mine data to find gaps in a curriculum (i.e., areas in which the curriculum is defective or requires supplementation). Flexible rostering can make day to day teaching, activities, and event management less tedious. The described method, system, and product can be used to define the parameters of any given environment of education, and may allow the relationships between entities to be used to map understanding of student, teacher, and school performance.

The described method, system, and product may also be used in connection with dynamic pivot data analysis and/or gap analysis heuristics and/or localized grid computing, Cloud and/or clustering technologies may be used to speed up data processing with large data sets. Custom built dynamic pivot data analysis in connection with the described method, system, and product may provide a great deal of flexibility in locating problem areas in the learning process. Built-in gap analysis heuristics may present meaningful information in a clear understandable manner.

The described method, system, and product further permits "backtracking" unlike a hierarchical data model; that is, the described method, system, and product allows the dynamic updating of elements in one or more element sets in response to the selection of one or more elements in one or more other element sets, without limiting the user to the selection of a child data set which stems from a previously-selected parent data set.

While this invention has been described in connection with what are currently considered to be the most practical and desirable embodiments, it is to be understood that the invention is not limited to the disclosed embodiments in any way as such are merely set forth for illustrative purposes. The present inventive system, method, and product are intended to cover an array of various modifications and equivalent arrangements, all of which are contemplated for inclusion within the scope and spirit of the disclosure and appended claims.

What is claimed is:

1. A computer-implemented method for building a roster, the method comprising:

storing data, the stored data corresponding to a data structure having an entity-relationship data model;

rendering a user interface on a graphical display, the user interface comprising an edit roster window, wherein the edit roster window includes a pivot frame, a definition frame, a student frame, and a summary frame;

wherein the pivot frame includes a pivot choice pane;

presenting by the pivot choice pane a list of entities, each entity representing a collection of data that is uniquely identified and that is related to a particular subject;

receiving a selection of a first entity associated with the data structure and a second entity associated with the data structure, the first entity including one or more elements and the second entity including one or more elements, each element being a subset of its own respective entity;

presenting by the definition frame a first list of elements in a first choice menu and a second list of elements in a second choice menu, the first list being associated with the first entity and the second list being associated with the second entity, wherein each choice menu comprises a list of one or more elements, and wherein each element in each list is a subset of its respective entity;

receiving a selection of an element from the first list of elements, wherein each of the choice menus allows a selection of one or more elements of the entity with which that particular choice menu is associated;

updating the second list of elements to include only one or more elements that are associated with the element selected from the first list of elements;

wherein the student frame includes a student metadata choice menu, and wherein the student metadata choice menu allows a selection of one or more filter options;

generating, by a processor, a roster display, wherein the roster display is included in the summary frame, the roster display being a graphical representation of summary data corresponding to i) the selection of one or more elements from the first choice menu and ii) the selection of one or more filter options; and providing a roster building application configured to render the user interface, the roster building application further being configured to receive, via the user interface:

i) the selection of the first entity associated with the data structure and the second entity associated with the data structure, ii) the selection of one or more elements from the first choice menu, and iii) the selection of one or more filter options, the roster building application further being configured to generate a roster and display the summary data from the roster in the user interface, and wherein displaying the summary data is displayed in the user interface.

2. The method of claim 1, further comprising:
presenting a third list of elements associated with a third entity;
receiving a selection of an element from the second list of elements; and
updating the third list of elements to include only one or more elements that are associated with both the element selected from the first list of elements and the element selected from the second list of elements;
wherein the summary data corresponds to the one or more elements that are associated with both the element selected from the first list of elements and the element selected from the second list of elements.

3. The method of claim 2, further comprising the step of updating the first list of elements to include only one or more elements that are associated with the element selected from the second list of elements.

4. The method of claim 2, wherein the first list of elements is not updated in response to the selection of an element from the second list of elements.

5. The method of claim 1, further comprising:
presenting a list of filter options; and
receiving a selection of a filter option;
wherein the summary data further corresponds to the selected filter option.

6. The method of claim 1, wherein the list of entities includes one or more pivot sets, each pivot set corresponding to a plurality of entities, and the step of receiving a selection of a first entity and a second entity comprises receiving a selection of a pivot set.

7. The method of claim 1, further comprising:
storing the roster in a data store.

8. The method of claim 1, further comprising:
receiving an update with new summary data;
generating a new roster, the new roster including the new summary data; and
displaying the summary data from the new roster in the user interface.

9. The method of claim 1, wherein the data structure is a relational data model and the one or more list of elements are selected from a group including: one or more schools, one or more classes, one or more assessments, one or more items, one or more units, one or more objects, one or more grades, performance data, one or more guardians, one or more students, demographic data, one or more teachers, one or more standards, professional development data, and financial data.

10. A non-transitory computer-readable storage medium having stored thereon computer-executable instructions for performing the method of claim 1.

11. A computer-implemented system for building a roster via a user interface, the system comprising:
a data store storing data, the data corresponding to a data structure having an entity-relationship data model;
a user interface comprising an edit roster window,
the edit roster window including a pivot frame, a definition frame, a student frame, and a summary frame,
the pivot frame including a pivot choice pane,
the pivot choice pane allowing a selection of a first entity associated with the data structure and a second entity associated with the data structure, the first entity including one or more elements and the second entity including one or more elements, each element being a subset of its own respective entity,
the definition frame including a first choice menu associated with the first entity and a second choice menu associated with the second entity, each choice menu comprising a list of one of more elements,
wherein each of the choice menus allows a selection of one or more elements of the entity with which that particular choice menu is associated,
the student frame including a student metadata choice menu,
the student metadata choice menu allowing a selection of one or more filter options,
the summary frame including a roster display,
the roster display being a graphical representation of summary data corresponding to i) the selection of one or more elements from the first choice menu and ii) the selection of one or more filter options; and
a roster building application configured to render the user interface, the roster building application further being configured to receive, via the user interface,
i) the selection of the first entity associated with the data structure and the second entity associated with the data structure,
ii) the selection of one or more elements from the first choice menu, and
iii) the selection of one or more filter options, the roster building application further being configured to generate a roster and display the summary data from the roster in the user interface.

12. The computer-implemented system of claim 11, in which the pivot choice pane allows a selection of one or more pivot sets.

13. A non-transitory computer-readable storage medium coupled to a processing unit, the non-transitory computer-readable storage medium having stored thereon user interface and the roster building application recited in claim 11.

* * * * *